United States Patent
Yamamura

(10) Patent No.: US 9,762,680 B2
(45) Date of Patent: Sep. 12, 2017

(54) NODE APPARATUS OPERATING AS PROXY SERVER

(71) Applicant: FUJITSU LIMITED, Kawasaki-shi, Kanagawa (JP)

(72) Inventor: Shinya Yamamura, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 203 days.

(21) Appl. No.: 14/548,662

(22) Filed: Nov. 20, 2014

(65) Prior Publication Data

US 2015/0172380 A1 Jun. 18, 2015

(30) Foreign Application Priority Data

Dec. 13, 2013 (JP) .................. 2013-258728

(51) Int. Cl.
*H04L 29/08* (2006.01)
*G06F 17/30* (2006.01)

(52) U.S. Cl.
CPC ........ *H04L 67/16* (2013.01); *G06F 17/30902* (2013.01); *H04L 67/2842* (2013.01);
(Continued)

(58) Field of Classification Search
CPC ....................................................... H04L 41/12
See application file for complete search history.

(56) References Cited

U.S. PATENT DOCUMENTS 6,263,402 B1 * 7/2001 Ronstrom ............... H04L 29/06
709/218
2009/0287835 A1 * 11/2009 Jacobson .............. H04L 67/104
709/229
(Continued)

FOREIGN PATENT DOCUMENTS

JP 3-278160 12/1991
JP 11-068744 3/1999
(Continued)

OTHER PUBLICATIONS

Guinard, Dominique, et al. "Interacting with the soa-based internet of things: Discovery, query, selection, and on-demand provisioning of web services."IEEE transactions on Services Computing 3.3 (2010): 223-235.*
(Continued)

*Primary Examiner* — Jimmy H Tran
(74) *Attorney, Agent, or Firm* — Fujitsu Patent Center

(57) ABSTRACT

A node apparatus connected to an information retention apparatus and a plurality of information reference request apparatuses via a network. The node apparatus includes a memory configured to store content identification information of content retained in the information retention apparatus, identification information of a first information reference request apparatus, and identification information of the information retention apparatus that are acquired through an information search initiated by a request from the first information reference apparatus.

When the node apparatus receives a content acquisition request including the content identification information from a second information reference request apparatus identification information of which is not stored in the memory, the node apparatus acquires the content from the information retention apparatus and respond to the request including the content identification information on behalf of the information retention apparatus.

8 Claims, 32 Drawing Sheets

(52) U.S. Cl.
CPC ............ *H04L 69/321* (2013.01); *H04L 67/12* (2013.01); *H04L 67/125* (2013.01); *H04L 67/288* (2013.01); *H04L 67/2814* (2013.01)

(56) References Cited

U.S. PATENT DOCUMENTS

| | | | | |
|---|---|---|---|---|
| 2010/0174775 | A1* | 7/2010 | Saiki | H04L 67/06 709/203 |
| 2013/0159451 | A1* | 6/2013 | Luciw | H04L 67/2842 709/213 |
| 2013/0198185 | A1* | 8/2013 | Kapoor | H04L 67/327 707/737 |
| 2014/0244833 | A1* | 8/2014 | Sharma | H04L 67/16 709/224 |
| 2014/0359131 | A1* | 12/2014 | Seed | H04L 47/125 709/226 |
| 2015/0189030 | A1* | 7/2015 | Li | H04L 51/18 709/217 |
| 2015/0381776 | A1* | 12/2015 | Seed | H04L 67/16 709/203 |
| 2016/0006815 | A1* | 1/2016 | Dong | G06F 9/46 709/204 |
| 2016/0072678 | A1* | 3/2016 | Dong | H04L 67/16 370/254 |
| 2016/0088049 | A1* | 3/2016 | Seed | G06F 9/541 709/203 |
| 2016/0119434 | A1* | 4/2016 | Dong | H04L 41/5054 709/220 |

FOREIGN PATENT DOCUMENTS

| | | |
|---|---|---|
| JP | 2001-512604 | 8/2001 |
| JP | 2006-135811 | 5/2006 |
| JP | 2009-277234 | 11/2009 |
| JP | 2010-160610 | 7/2010 |

OTHER PUBLICATIONS

Accettura, Nicola, et al. "Decentralized traffic aware scheduling for multi-hop low power lossy networks in the internet of things." World of Wireless, Mobile and Multimedia Networks (WoWMoM), 2013 IEEE 14th International Symposium and Workshops on a. IEEE, 2013.*

Miorandi, Daniele, et al. "Internet of things: Vision, applications and research challenges." Ad Hoc Networks 10.7 (2012): 1497-1516.*

Gubbi, Jayavardhana, et al. "Internet of Things (IoT): A vision, architectural elements, and future directions." Future generation computer systems 29.7 (2013): 1645-1660.*

Uckelmann, Dieter, Mark Harrison, and Florian Michahelles. "An architectural approach towards the future internet of things." Architecting the internet of things. Springer Berlin Heidelberg, 2011. 1-24.*

Japanese Office Action dated Jul. 11, 2017 for corresponding Japanese Patent Application No. 2013-258728, with English Translation, 6 pages.

Yamamura, Shinya et al.,"Dynamic Arrangement Method of Data Transfer Proxy with Information Retrieval" IEICE (The Institute of Electronics, Information and Communication Engineers), Technical Report, NS2013-134—NS2013-162, Network Systems, vol. 113, No. 360 pp. 31-36, Dec. 19-20, 2013, with Partial English Translation.

* cited by examiner

FIG.10

| TCP/IP DATAGRAM | | | |
|---|---|---|---|
| VERSION | HEADER LENGTH | TOS | TOTAL LENGTH |
| IDENTIFICATION | | FLAGS | FRAGMENT OFFSET |
| TTL | PROTOCOL | | HEADER CHECKSUM |
| SOURCE IP ADDRESS | | | |
| DESTINATION IP ADDRESS | | | |
| OPTIONS | | | PADDING |
| SOURCE PORT | | DESTINATION PORT | |
| SEQUENCE NUMBER | | | |
| ACKNOWLEDGEMENT NUMBER | | | |
| HEADER LENGTH | RESERVED | CODW BIT | WINDOW SIZE |
| CHECKSUM | | ACKNOWLEDGEMENT NUMBER | |
| OPTIONS | | | |
| DATA | | | |

FIG.11

PART OF CONFIGURATION INFORMATION OF EACH MESSAGE

|  | PUBLISH | QUERY | NOTIFY | REDIRECT | REQUEST | DATA |
|---|---|---|---|---|---|---|
| SOURCE IP ADDRESS | IP ADDRESS OF GENERATOR APPARATUS OF MESSAGE | IP ADDRESS OF GENERATOR APPARATUS OF MESSAGE | IP ADDRESS OF GENERATOR APPARATUS OF MESSAGE | IP ADDRESS OF GENERATOR APPARATUS OF MESSAGE | IP ADDRESS OF GENERATOR APPARATUS OF MESSAGE | IP ADDRESS OF GENERATOR APPARATUS OF MESSAGE |
| DESTINATION IP ADDRESS | IP ADDRESS OF ADJACENT GATEWAY APPARATUS | IP ADDRESS REGISTERED IN LINK INFORMATION | IP ADDRESS OF SOURCE APPARATUS OF QUERY | QUERY REQUESTER ADDRESS INDICATED IN QUERY LIST | IP ADDRESS OF INFORMATION INTENTION IN QUERY LIST | IP ADDRESS OF SOURCE APPARATUS OF REQUEST |
| DATA | CONTENT NAME, CONTENT VALUE | CONTENT NAME, QUERY ID, PATH HISTORY | CONTENT NAME, QUERY ID, IP ADDRESS OF INFORMATION RETENTION APPARATUS | CONTENT NAME, QUERY ID, IP ADDRESS OF INFORMATION RETENTION APPARATUS | CONTENT NAME, QUERY ID, REQUEST ID, PROXY FUNCTION INFORMATION | CONTENT MANE, QUERY ID, REQUEST ID, CONTENT VALUE, CONTROL INFORMATION |

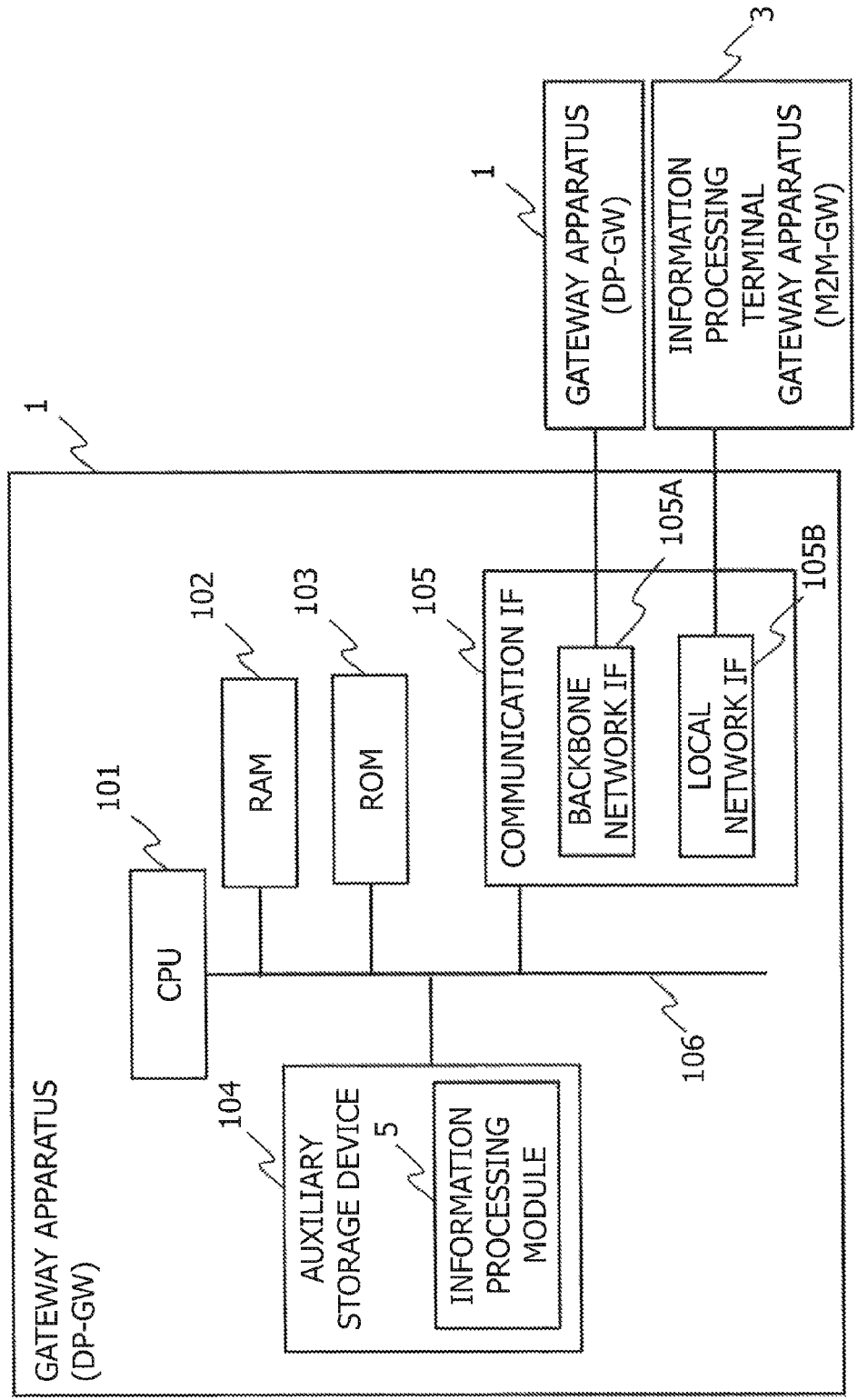

FIG.14

ONE EXAMPLE OF PROCESS PENDING LIST

| REQUEST ID | REQUESTER IP ADDRESS | PROXY FUNCTION INFORMATION |
|---|---|---|
| sf200_query01 | IP ADDRESS OF SMART PHONE#2 | synchronize=600s |
| ... | ... | ... |

REQUEST ID →

ONE EXAMPLE OF PROXY INFORMATION

| PROXY TYPE IDENTIFICATION INFORMATION | EXECUTION PROGRAM | BASIC PARAMETER |
|---|---|---|
| IDENTIFICATION INFORMATION OF PROXY FUNCTION | PROXY EXECUTION PROGRAM | PARAMETER OF EXECUTION OBJECT |
|  | | |

PROXY TYPE IDENTIFICATION INFORMATION →

FIG.16

ONE EXAMPLE OF PROXY MANAGEMENT LIST

| NAME OF QUERY TARGET CONTENT | EXECUTION OBJECT | EXECUTION PARAMETER | EXECUTION CONDITION | EXECUTE STATE |
|---|---|---|---|---|
| temp_LocA_sensor0001 | TEMPERATURE PROXY PROGRAM | PARAMETER | NUMBER OF QUERY REQUESTERS = 10 | IN EXECUTION |
| | | | | |

FIG.17

ONE EXAMPLE OF QUERY LIST

| NAME OF QUERY TARGET CONTENT | QUERY ID | QUERY REQUESTER IP ADDRESS | QUERY DESTINATION IP ADDRESS | IP ADDRESS OF INFORMATION RETENTION APPARATUS |
|---|---|---|---|---|
| temp_LocA_* | sf100_query01 | IP ADDRESS OF SMART PHONE#1 | IP ADDRESS OF DP-GW#4 | IP ADDRESS OF DP-GW#1 |
| ⋮ | ⋮ | | | |

→ NAME OF QUERY TARGET CONTENT

FIG.19

ONE EXAMPLE OF ID CACHE

| PROXY ID | CONTENT VALUE | CONTROL INFORMATION |
|---|---|---|
| temp_LocA_sensor0001 | 28°C | liftime=300s |

PROXY ID →

ONE EXAMPLE OF NAMING RULE LIST

| NAMING RULE TYPE | FORMAT |
|---|---|
| TEMPERATURE SENSOR | <INFORMATION IDENTIFIER PREFIX> + SEPARATOR + <LOCATION IDENTIFIER> + SEPARATOR + <SENSOR IDENTIFIER> |
| ... | ... |

| ELEMENT IDENTIFIERS | RULE |
|---|---|
| INFORMATION IDENTIFIER PREFIX | temp |
| LOCATION IDENTIFIER | LocA |
| SENSOR IDENTIFIER | ID NOTIFIED BY SENSOR |
| SEPARATOR | _ |

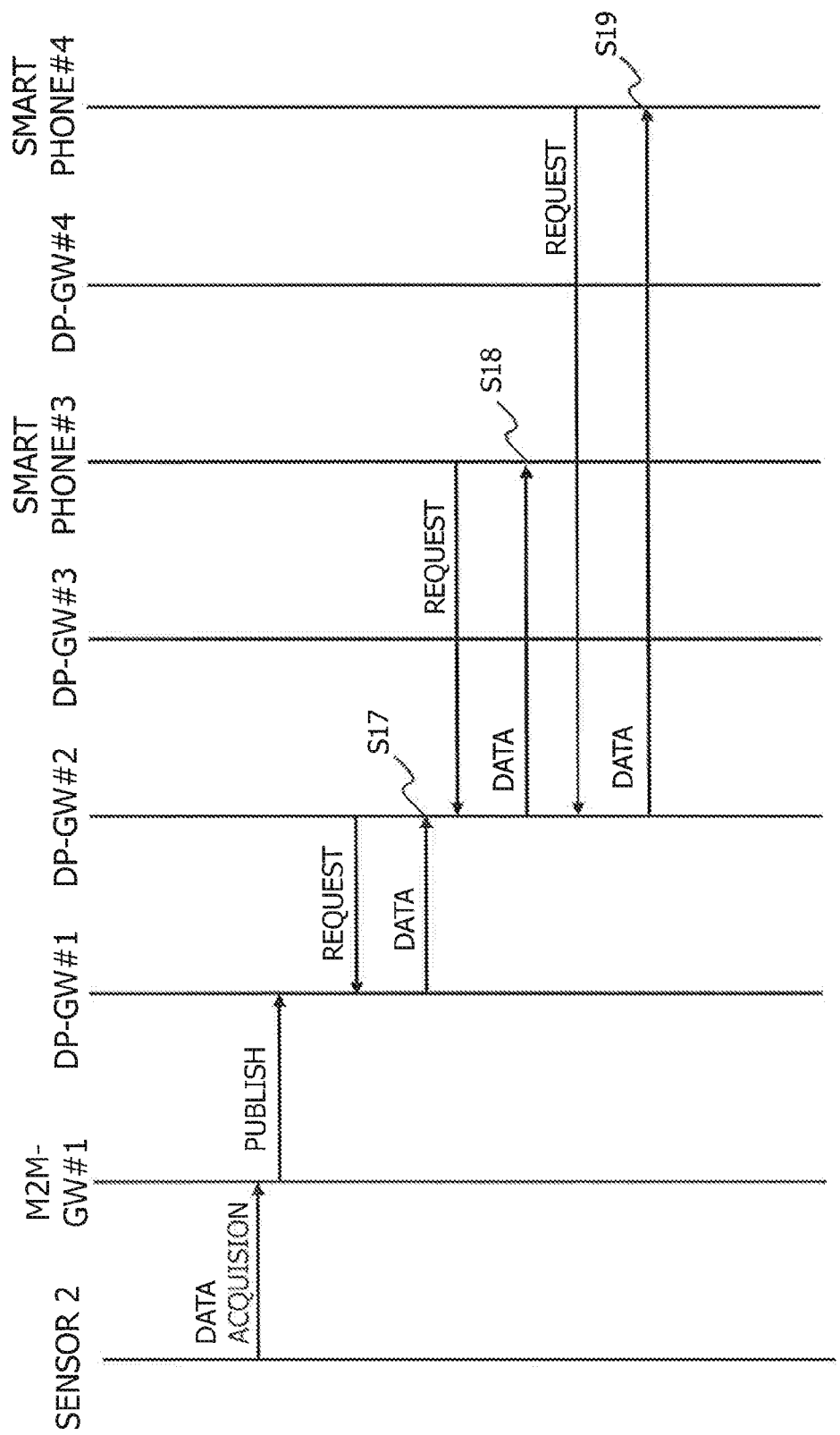

NODE APPARATUS OPERATING AS PROXY SERVER

CROSS-REFERENCE TO RELATED APPLICATION

This application is based upon and claims the benefit of priority of the prior Japanese Patent Application No. 2013-258728, filed on Dec. 13, 2013, the entire contents of which are incorporated herein by reference.

FIELD

The present invention relates a node apparatus, an information processing system, an information processing method, and an information processing program.

BACKGROUND

As web services and search engines become prevalent, networks are recently used not merely as communication means but also as a huge database that accumulates diverse information. The information accumulated in networks includes, for example, text information, still images, audio, and movies, and the amount of the accumulated information is increasing year after year.

Also, in a service like M2M (Machine-to-Machine) or IOT (Internet of Things), apparatuses connected to a network mutually distribute information in real time. In a network providing a service like M2M or IOT, all communication peers exchange information bidirectionally and flatly. Thus, the amount of network traffic is increasing.

FIG. 1 is a diagram illustrating one example of an information reference system. An information reference system P100 illustrated in FIG. 1 is a system in which six information reference apparatuses P1 to P 6 reference information from one information generation apparatus P9. The information reference apparatuses P1 to P6 identify the information generation apparatus P9 by using a DNS (domain name server), for example, individually establish a connection to the information generation apparatus P9, and communicate with an application interface by using a protocol. Thus, six connections are established in the information reference system P100 illustrated in in FIG. 1. In this case, traffic congestion occurs more likely at a position that is closer to the information generation apparatus P9.

FIG. 2 illustrates one example of an information reference system. As with the information reference system P100 illustrated in FIG. 1, an information reference system P200 in FIG. 2 is a system in which the six information reference apparatuses P1 to P 6 reference information from the one information generation apparatus P9.

The information reference system P200 illustrated in FIG. 2 includes proxy servers P11 to P13 provided at positions in the vicinity of each of the information reference apparatuses. For example, as a proxy processing for the information reference apparatus P1, the proxy server P11 acquires referenced information from the information generation apparatus P9 and retains the referenced information in a cache. Afterwards, if a request for referencing the same referenced information is received from another information reference apparatus P2, the proxy server P11 responds to the information reference apparatus P2. Also, when the other proxy servers P12 and P13 receive, from an information reference apparatus belonging thereto, a request for information from the information generation apparatus P9, the proxy servers P12 and P13 can acquire the referenced information not from the information generation apparatus P9 but from the proxy server P11.

Thus, with the proxy provided in the vicinity of each information reference apparatus, traffic can be distributed and the possibility of congestion can be reduced.

Patent Document

[Patent Document 1] Japanese Patent Laid-Open No. H03-278160
[Patent document 2] National Publication of International Patent Application No. 2001-512604
[Patent document 3] Japanese Patent Laid-Open No. 2006-135811
[Patent document 4] Japanese Patent Laid-Open No. H11-68744
[Patent document 5] Japanese Patent Laid-Open No. 2010-160610
[Patent document 6] Japanese Patent Laid-Open No. 2009-277234

A system in which all communication peers exchange information bidirectionally and flatly, such as M2M and IOT, however, has the following problems.

In a system in which all communication peers exchange information bidirectionally and flatly, the condition of referencing information dynamically changes, making it difficult to predict the occurrence of information request and a position where traffic concentrates. Thus, preliminarily providing a proxy server or a cache server at a predetermined position may not produce a desired effect of distributing traffic, for example.

Also, a system like M2M and IOT includes, for example, a system handling temperature information generated by a temperature sensor as an information generation apparatus, and the detail of the referenced content is expected to change dynamically in a system like M2M and IOT. When the detail of the content dynamically changes, the cache in the proxy server or the cache server is updated from the information generation apparatus as the detail of the content is updated. As described above, however, because it is difficult to predict traffic in a system like M2M and IOT, determining the deployment of a proxy server or a cache server is even more difficult.

SUMMARY

According to one aspect, the present invention is a node apparatus connected to an information retention apparatus and an information reference request apparatus via a network, the node apparatus including: a memory configured to store content identification information of content retained in the information retention apparatus, identification information of a first information reference request apparatus, and identification information of the information retention apparatus that are acquired in an information search initiated by the first information reference request apparatus with a request including the content identification information of the content retained in the information retention apparatus and the identification information of the first information reference request apparatus; and a processor configured to acquire the content from the information retention apparatus and respond to the request including the content identification information on behalf of the information retention apparatus when a predetermined condition based on the information stored in the memory is satisfied.

Another aspect of the present invention is an information processing system including an information retention apparatus, an information reference request apparatus, and the above-described node apparatus. Still another aspect of the present invention is an information processing method for a node apparatus to execute the above-described processing. Yet another aspect of the present invention can include a program for causing a computer to function as the above-described node apparatus and a computer-readable non-transitory storage medium that stores the program. The computer-readable non-volatile storage medium means a storage medium that is capable of accumulating information, such as data and a program, via electric, magnetic, optical, mechanical, or chemical action and reading the information from a computer or the like.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating a format of a datagram of TCP;

FIG. 11 is a diagram illustrating one example of message types and a part of setting information;

FIG. 12 is a diagram illustrating one example of a hardware configuration of a GW apparatus (DP-GW);

FIG. 14 is a diagram illustrating one example of a process pending list;

FIG. 16 is a diagram illustrating one example of a proxy management list;

FIG. 17 is a diagram illustrating one example of a query list;

FIG. 19 is a diagram illustrating one example of an ID cache;

FIG. 30 is one example of a processing sequence of an information processing system.

DESCRIPTION OF EMBODIMENTS

Embodiments of the present invention will now be described with reference to the drawings. The configuration of the following embodiment is an example, and the present invention is not limited to the configuration of the embodiment.

<First Embodiment>

<Flow of Processing in Information Process System>

FIGS. 3, 4, 5, 6, 7, and 8 are diagrams illustrating one example of a series of processes involved in referencing information in an information processing system of the first embodiment. The information processing systems illustrated in FIGS. 3 to 8 represent a same system that includes an information generation apparatus, a plurality of information reference apparatuses, and a plurality of relay apparatuses. In these figures, each apparatus has a value of the last 16 digits of an IP address represented in a decimal format. In the description of FIGS. 3 to 8, each apparatus is identified with the value of the last 16 digits of an IP address represented in a decimal format.

Figure 1:
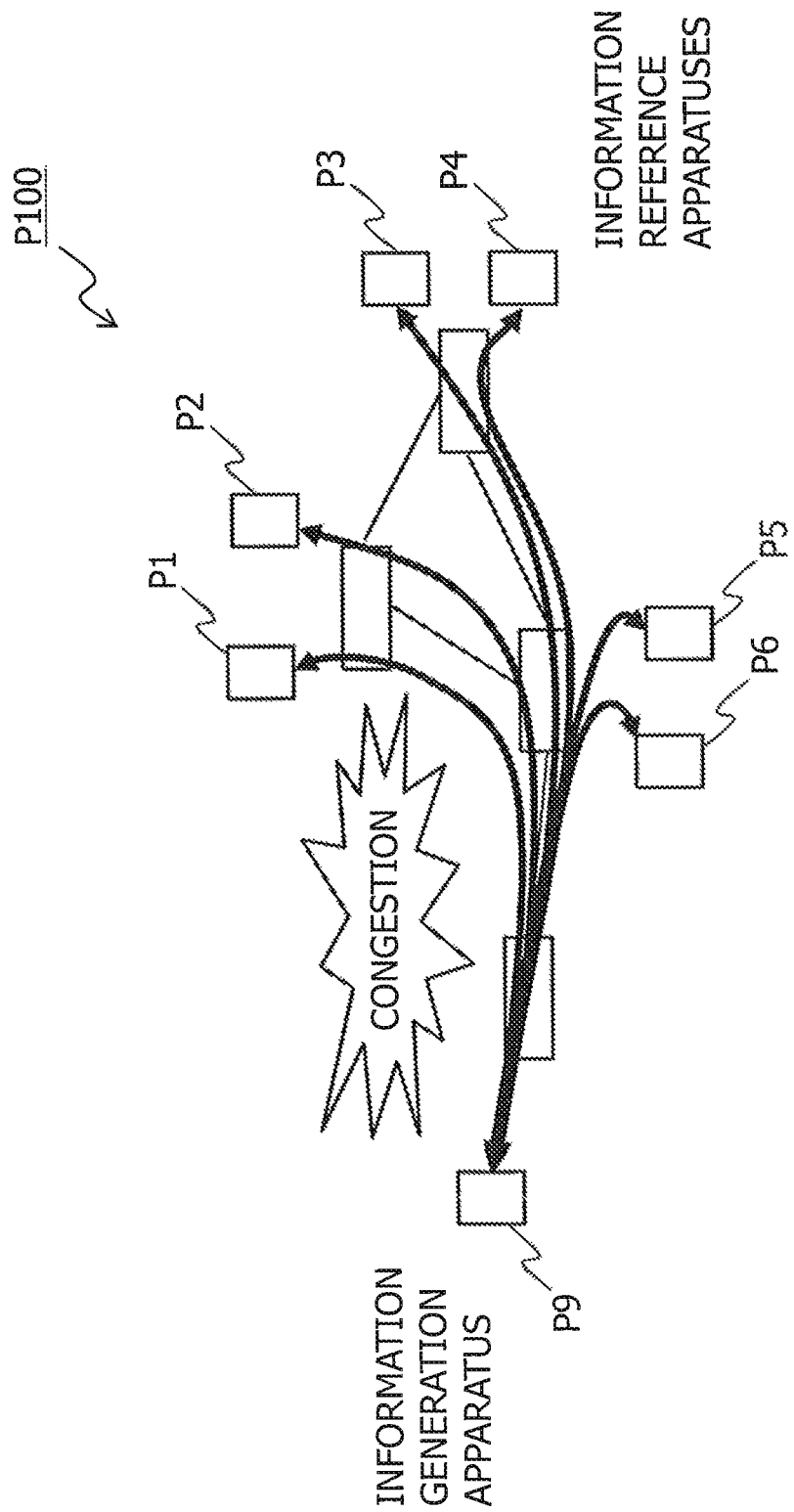
FIG. 1 is a diagram illustrating one example of an information reference system.
Figure 2:
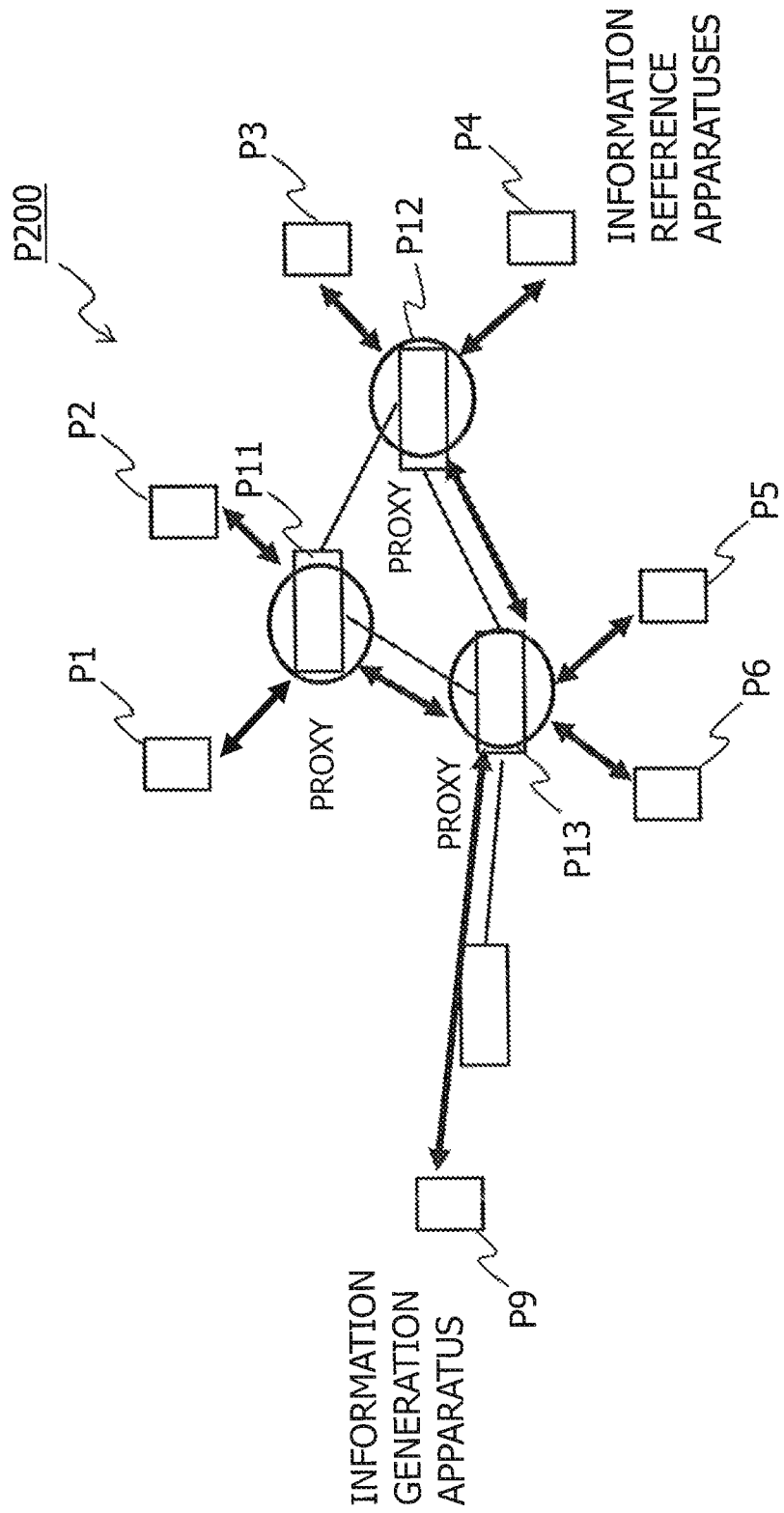
FIG. 2 is a diagram illustrating one example of an information reference system.
Figure 3:
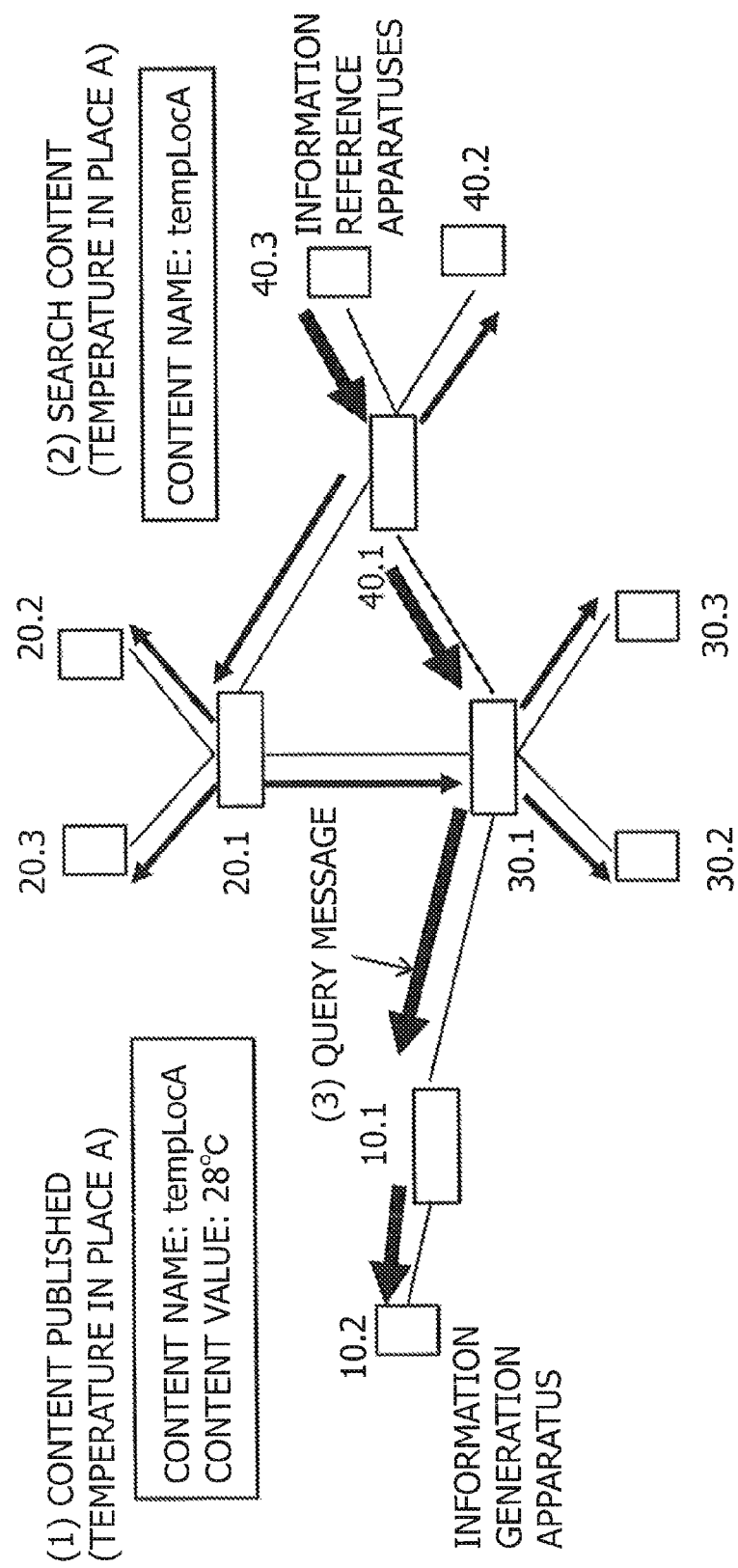
FIG. 3 is a diagram illustrating one example of a series of processes involved in referencing information in an information processing system of a first embodiment.

FIG. 3 is a diagram illustrating one example of a process of registering and searching content. (1) For example, an information generation apparatus 10.2 is a temperature sensor and registers content named "tempLocA" in a cache for publishing content. The content named "tempLocA" is the information of temperature, the value thereof being indeterminate.

(2) Next, an information reference apparatus 40.3 sends a QUERY message that is a request for searching the content named "tempLocA". The QUERY message is sent from the information reference apparatus 40.3 by broadcasting, for example.

(3) The QUERY message initially arrives at a relay apparatus 40.1 in a NW to which the information reference apparatus 40.3 is connected. The QUERY message is then relayed between adjacent relay apparatuses until the QUERY message arrives at the apparatus having the searched content "tempLocA" (an information generation apparatus 10.2).

At this point, each relay apparatus does not know the location (IP address) of the apparatus having the content "tempLocA" requested in the QUERY message. Thus, the QUERY message is relayed to all adjacent apparatuses. A destination IP address and a source IP address of the QUERY message are rewritten by each apparatus as the QUERY message is relayed. The destination IP address of the QUERY message is rewritten to the IP address of an adjacent apparatus, and the source IP address of the QUERY message is rewritten to the IP address of the own apparatus. For example, when the QUERY message is relayed from the relay apparatus 40.1 to an adjacent relay apparatus 30.1, the destination IP address of the QUERY message is rewritten to the IP address of the relay apparatus 30.1 and the source IP address of the QUERY message is rewritten to the IP address of the relay apparatus 40.1.

Figure 4:
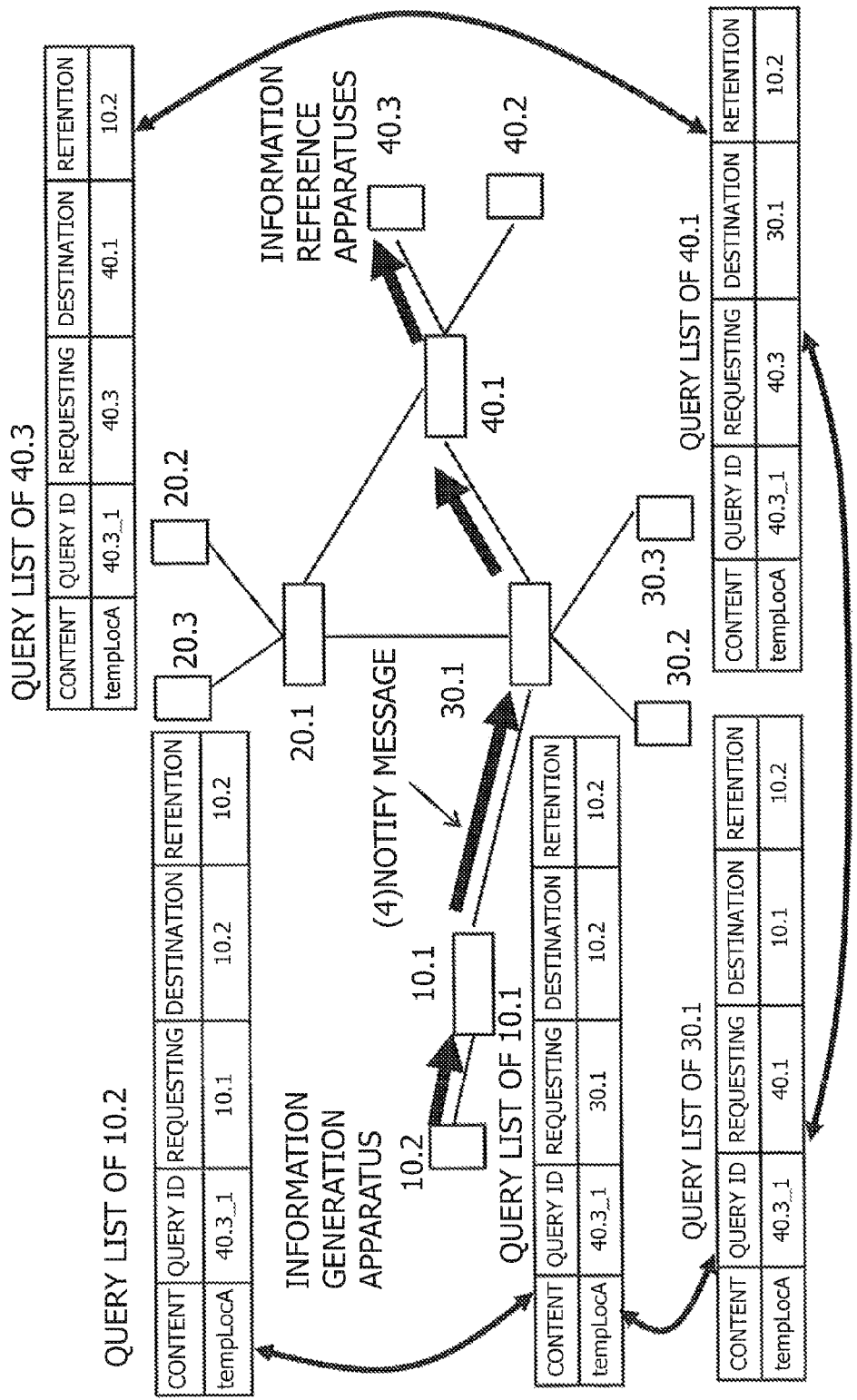
FIG. 4 is a diagram illustrating one example of a series of processes involved in referencing information in the information processing system of the first embodiment.

FIG. 4 is a diagram illustrating one example of a process of generating a query list. The query list is provided in each apparatus and stores information about a QUERY message that is received, sent, or relayed by each apparatus. The query list includes, for example, queried content, a query ID, the IP address of a requesting apparatus, the IP address of a destination, and the IP address of an information retention apparatus.

The queried content, the query ID, the IP address of a requesting apparatus, and the IP address of a destination of the query list are acquired when a QUERY message is relayed and are stored in the query list. In other words, the query list in each apparatus does not include the IP address of an information retention apparatus when a QUERY message is received or relayed.

(4) When the QUERY message arrives at the information generation apparatus 10.2, the information generation apparatus 10.2 sends a NOTIFY message that gives notice of the possession of the content "tempLocA" requested in the QUERY message. The NOTIFY message includes the information about the information generation apparatus 10.2, which is the content retention apparatus of the content "tempLocA" requested in the QUERY message. The information generation apparatus 10.2 sets the destination IP address of the NOTIFY message to the source IP address of the received QUERY message, or the IP address of the relay apparatus 10.1, when sending the NOTIFY message.

As with the case of the QUERY message, the destination and source IP addresses of the NOTIFY message are rewritten as the NOTIFY message is relayed by each apparatus. The destination IP address of the NOTIFY message is set to the IP address of the requesting apparatus of the QUERY message, which can be acquired from the query list. Also, the source IP address of the NOTIFY message is set to the IP address of the own apparatus.

Thus, the NOTIFY message passes through the same path as the QUERY message in the reverse direction to go back to the information reference apparatus 40.3. Each apparatus acquires the IP address of the information retention apparatus of the content "tempLocA" requested in the QUERY message by relaying or receiving the NOTIFY message and records the acquired IP address in the query list. Each apparatus completes the search of the content as it receives the NOTIFY message corresponding to the QUERY message. That is, all items of the query list are filled when the search of the content completes. FIG. 4 illustrates one example of query lists in each apparatus when the search completes.

Figure 5:
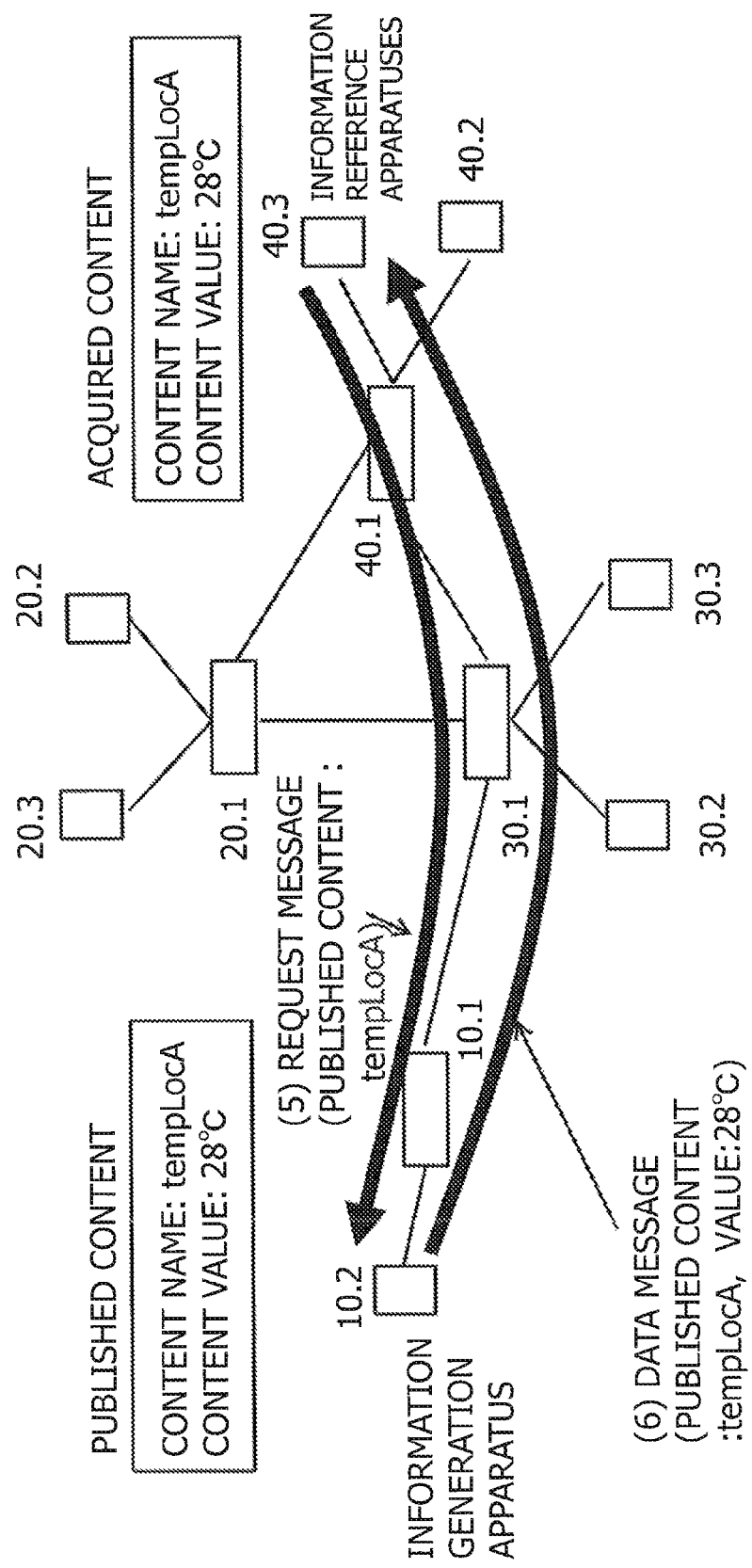
FIG. 5 is a diagram illustrating one example of a series of processes involved in referencing information in the information processing system of the first embodiment.

FIG. 5 is a diagram illustrating one example of a content acquisition process of an information reference apparatus. (5) The information reference apparatus 40.3 sends a REQUEST message, which is a request for acquiring the content "tempLocA", by setting the destination IP address of the REQUEST message to the IP address of the information generation apparatus 10.2, which is indicated in the NOTIFY message. The REQUEST message is relayed by each relay apparatus until arriving at the destination, or the information generation apparatus 10.2.

(6) Upon receiving the REQUEST message, the information generation apparatus 10.2 sends a DATA message that includes the value of the content "tempLocA" requested in the REQUEST message to the information reference apparatus 40.3, which sent the REQUEST message. Because the content "tempLocA" has an indeterminate value, the information reference apparatus 40.3 periodically sends a REQUEST message, which is a request for acquiring the content "tempLocA", to the information generation apparatus 10.2 to acquire the content "tempLocA".

Figure 6:
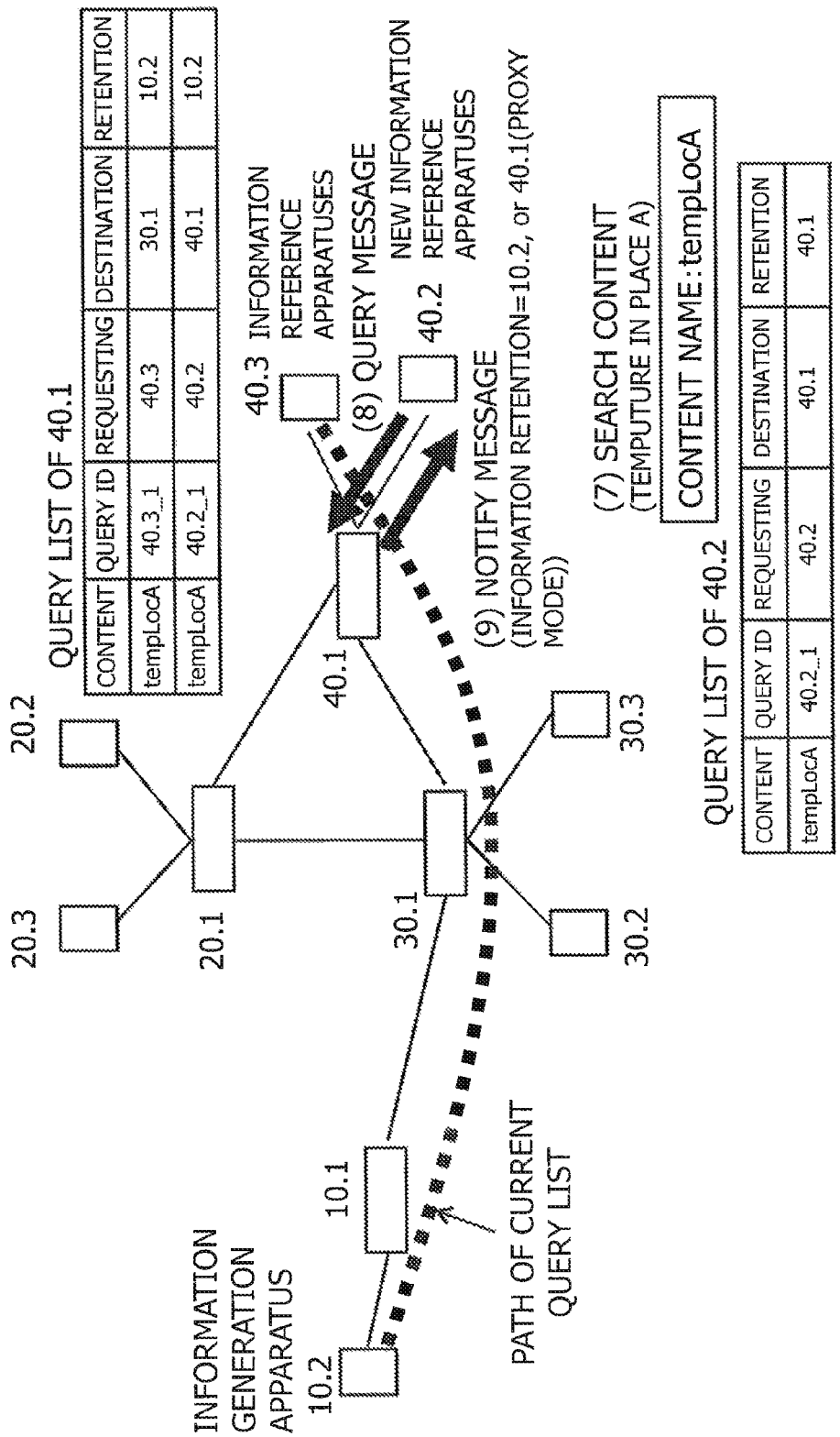
FIG. 6 is a diagram illustrating one example of a series of processes involved in referencing information in the information processing system of the first embodiment.

FIG. 6 is a diagram illustrating one example of a content search process of another information reference apparatus. In FIG. 6, (7) an information reference apparatus 40.2 initiates another search of the content "tempLocA". (8) The information reference apparatus 40.2 sends a QUERY message, which is a request for searching the content "tempLocA".

(9) The QUERY message sent from the information reference apparatus 40.2 arrives at the relay apparatus 40.1. The relay apparatus 40.1 has processed the search of the same content "tempLocA" in the past and has recorded the IP address of the information retention apparatus of the content "tempLocA" in the query list. Thus, the relay apparatus 40.1 sends a NOTIFY message to the information reference apparatus 40.2, setting in the NOTIFY message the IP address of the information generation apparatus 10.2, which is the information retention apparatus of the content "tempLocA", without relaying the QUERY message to an adjacent relay apparatus. This enables the information reference apparatus 40.2 to acquire and record in its query list the IP address of the information generation apparatus 10.2 as the information retention apparatus of the content "tempLocA".

Through the processing of the first search request (QUERY message), the query list is dynamically generated in each apparatus on the path through which the QUERY message and the NOTIFY message pass. Thus, when another apparatus requests a search of content having the same name, the IP address of the apparatus retaining information of that content is returned as a result of the search in accordance with the query list. This makes it possible to flexibly deal with the movement of information generation apparatuses, for example, and to increase the efficiency of a content search process.

In the process of (9), the relay apparatus 40.1 may send the NOTIFY message to the information reference apparatus 40.2 by setting the IP address of the content retention apparatus of the content "tempLocA" to the IP address of the relay apparatus 40.1 itself instead of the information generation apparatus 10.2. For example, when the function of the relay apparatus 40.1 as a proxy server is enabled, the relay apparatus 40.1 sets its own IP address in a NOTIFY message and sends the NOTIFY message to the information reference apparatus 40.2 in the process of (9). The state in which the function of the relay apparatus 40.1 as a proxy server is enabled will hereinafter be referred to as a proxy mode. FIG. 6 illustrates the query lists in which the relay apparatus 40.1 is working in the proxy mode and the information reference apparatus 40.2 recognizes the relay apparatus 40.1 as the information retention apparatus of the content "tempLocA".

Figure 7:
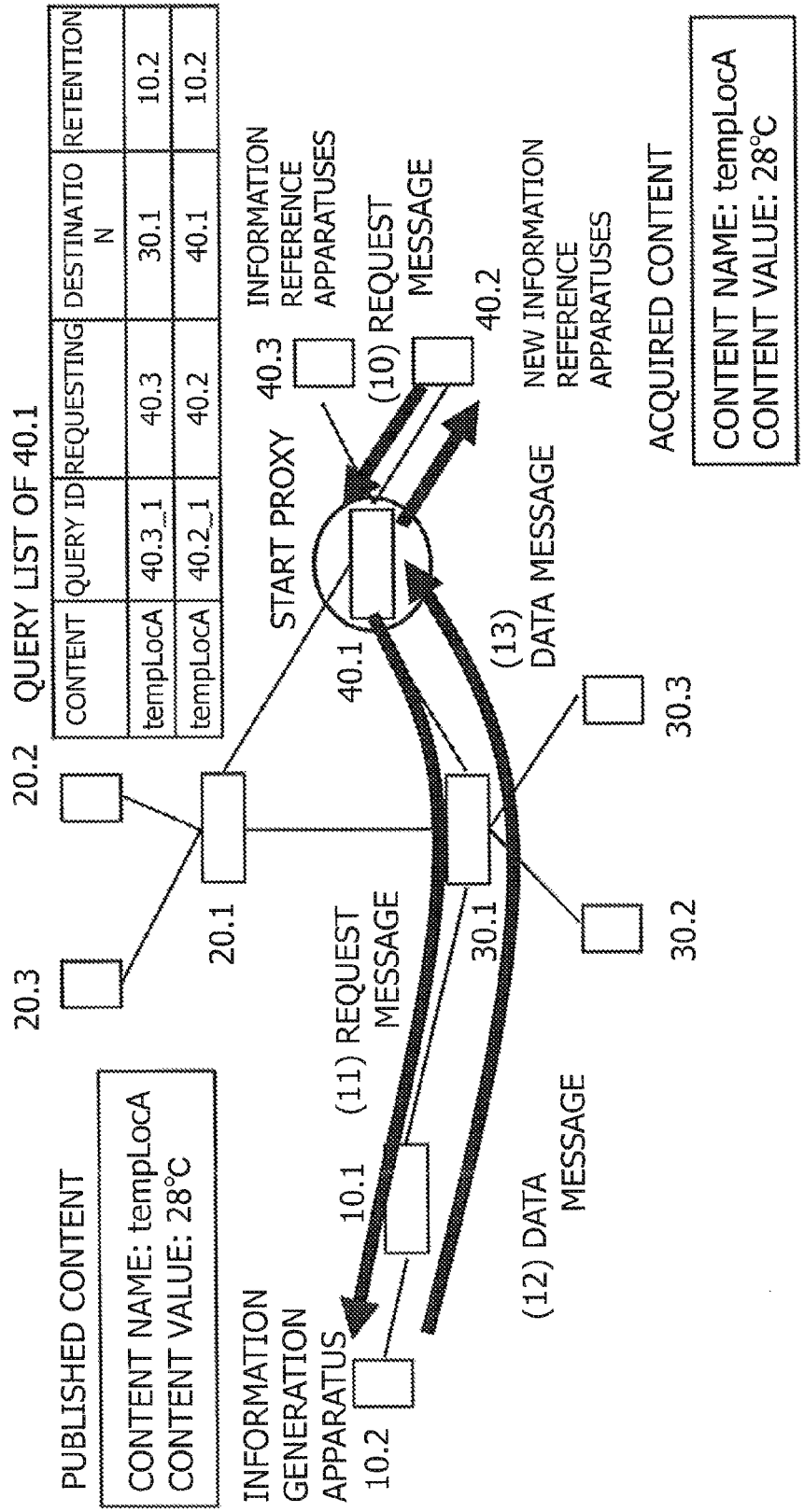
FIG. 7 is a diagram illustrating one example of a series of processes involved in referencing information in the information processing system of the first embodiment.

FIG. 7 is a diagram illustrating one example of a content acquisition process of another information reference apparatus 40.2. FIG. 7 illustrates the example in which the relay apparatus 40.1 is working in the proxy mode and the information reference apparatus 40.2 recognizes the relay apparatus 40.1 as the information retention apparatus of the content "tempLocA".

(10) Upon receiving the NOTIFY message, the information reference apparatus 40.2 sends a REQUEST message, which is a request for acquiring the content, to the relay apparatus 40.1, which is indicated in the NOTIFY message as the information retention apparatus.

(11) Upon receiving the REQUEST message, the relay apparatus 40.1 works as a proxy server of the information generation apparatus 10.2. Specifically, the relay apparatus 40.1 sends a REQUEST message for the content "tempLocA" to the information generation apparatus 10.2. (12) Upon receiving the REQUEST message, the information generation apparatus 10.2 sends a DATA message including the content "tempLocA" by setting the relay apparatus 40.1 as a destination.

(13) Upon receiving the DATA message, the relay apparatus 40.1 stores the content "tempLocA" in a cache and sends a DATA message including the content "tempLocA" to the information reference apparatus 40.2.

After that, the relay apparatus 40.1 periodically sends a REQUEST message for the content "tempLocA" to the information generation apparatus 10.2, acquires the content "tempLocA", and stores the content in the cache. Also, the information reference apparatus 40.2 acquires the content "tempLocA" from the relay apparatus 40.1.

Accordingly, an apparatus that receives a request for searching content from an apparatus not registered in a query list is highly possibly a branch point of information distribution in a network topology. Thus, allowing such apparatus to dynamically execute a proxy function, a proxy function can be deployed for increasing the utilization ratio of a network. The increase of the utilization ratio of a network includes reducing the traffic in the whole network and decreasing the utilization of a resource such as a memory.

Figure 8:
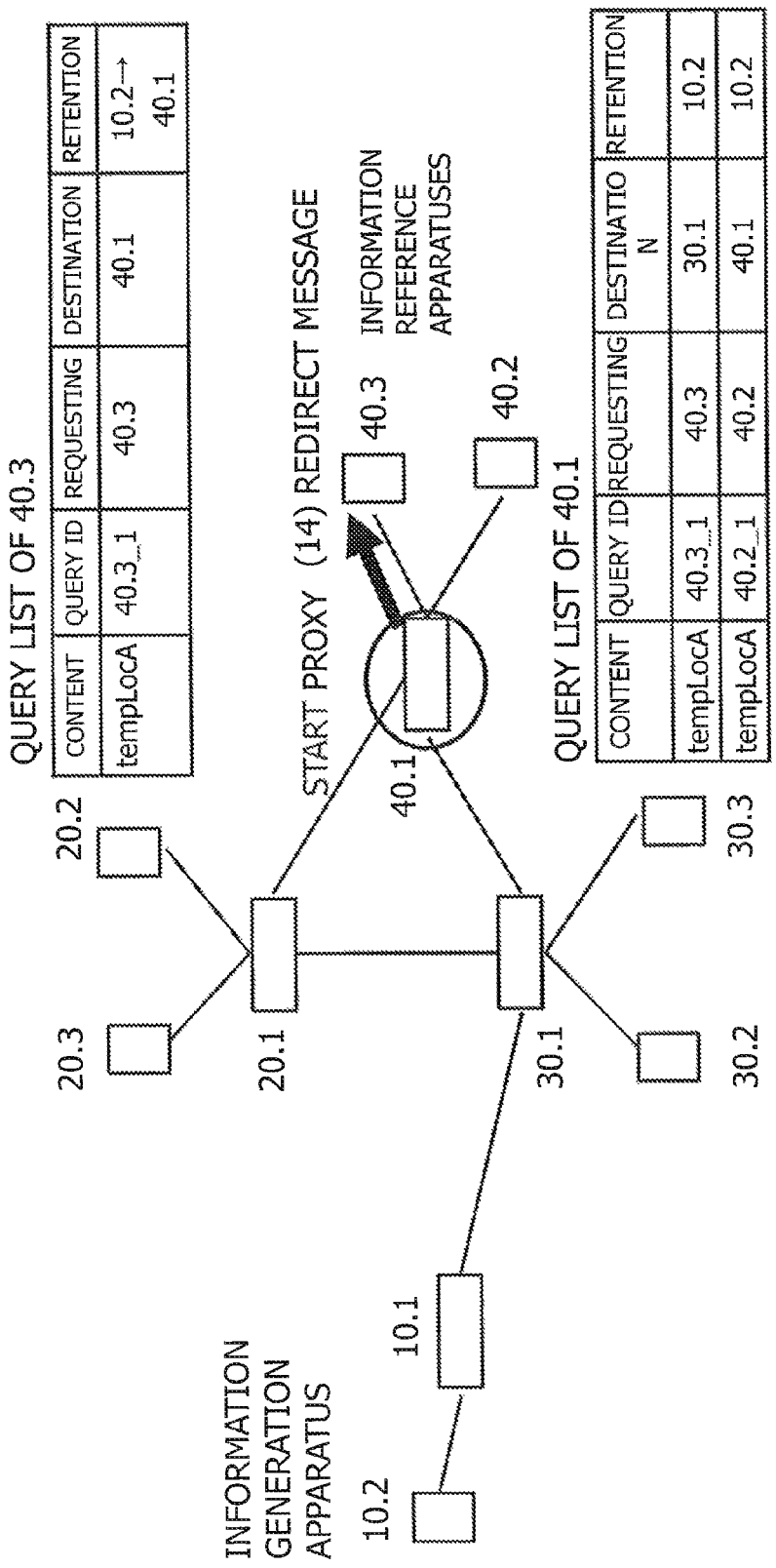
FIG. 8 is a diagram illustrating one example of a series of processes involved in referencing information in the information processing system of the first embodiment.

FIG. 8 illustrates one example of a process for giving notice of movement of an information retention apparatus. In the process of (12) in FIG. 7, the relay apparatus 40.1 acquired the content "tempLocA" and started working as a proxy server for the information reference apparatus 40.2.

In the query list, not merely the information reference apparatus 40.2 but also the information reference apparatus 40.3 are registered as an apparatus referencing information of the content "tempLocA". Thus, the relay apparatus 40.1 sends the information reference apparatus 40.3 a REDIRECT message for giving notice that the information retention apparatus of the content "tempLocA" has changed from the information generation apparatus 10.2 to the relay apparatus 40.1.

Upon receiving the REDIRECT message, the information reference apparatus 40.3 rewrites the IP address of the information retention apparatus in the corresponding entry of the query list to the IP address of the relay apparatus 40.1 indicated in the REDIRECT message. After that, the information reference apparatus 40.2 and the information reference apparatus 40.3 send a REQUEST message, which is a request for acquiring the content "tempLocA", to the relay apparatus 40.1 and acquire the content "tempLocA" from the relay apparatus 40.1.

This enables aggregation of the traffic of content from the information generation apparatus 10.2 to the information reference apparatus 40.2 and the information reference apparatus 40.3.

For example, when one of the information reference apparatuses 40.2 and 40.3 stops referencing the information, the relay apparatus 40.1 stops the dynamically deployed proxy function and sends the address information of the information retention apparatus 10.2 of the information "tempLocA" currently referenced by the information reference apparatuses to the other of the information reference apparatuses 40.2 and 40.3 that has not stopped referencing the information via a REDIRECT message. This restores the query list of each apparatus to the state illustrated in FIG. 4. Reference of the information may be stopped via an explicit stop message from an information reference apparatus or via a timer indicating the effective period of the proxy function.

<Configuration Example of Information Processing System>

Figure 9:
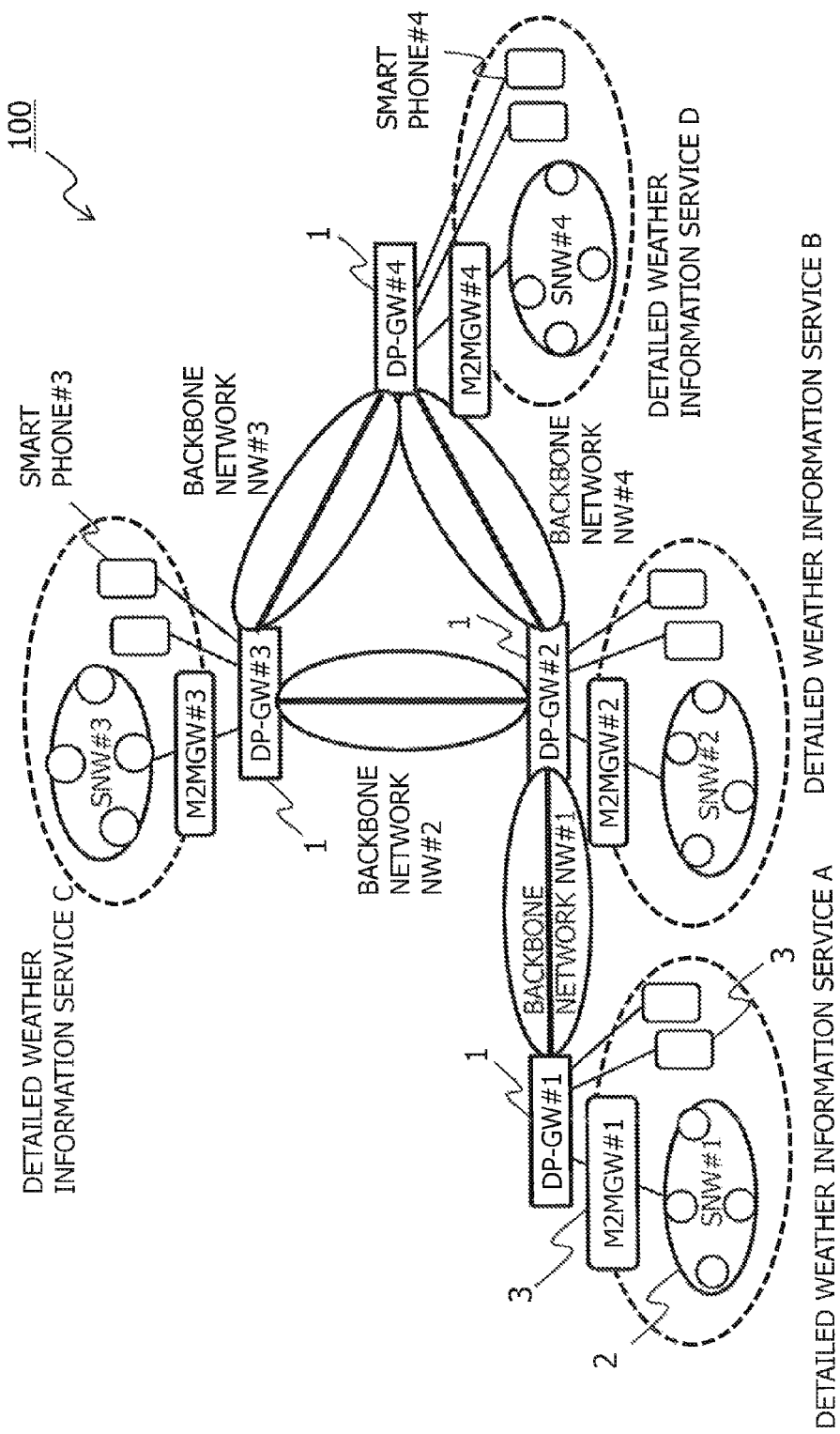
FIG. 9 is a diagram illustrating a configuration example of an information processing system.

FIG. 9 is a diagram illustrating a configuration example of an information processing system. The first embodiment will hereinafter be described on the basis of the system illustrated in FIG. 9. An information processing system 100 is a system of a detailed weather information service in which a user can obtain detailed weather data of a particular region from a sensor network in which weather information observation apparatuses having various sensors for temperature, moisture, and atmospheric pressure, for example, are densely deployed by specifying any location via a smart phone. In this type of service wherein sensors are densely allocated for providing information, a plurality of service providers respectively providing the service in a limited service area emerges, because building a sensor infrastructure covering a wide area is difficult. The mutual cooperation among these service providers enables users to obtain information of any particular region.

In the case of the information processing system 100 illustrated in FIG. 9, detailed weather information service networks A, B, C, and D provided by four different service providers mutually cooperate to provide a service. The network of each service provider includes a sensor network (SNWs#1 to #4) having weather information observation apparatuses (sensors) 2, a gateway (GW) apparatus (M2M-GWs#1 to #4) for collecting and publishing sensor information, and a GW apparatus (DP-GWs#1 to #4) for cooperating with a network of another service provider. Each of the detailed weather information service networks A, B, C, and D is connected via a backbone network (NWs#1 to #4). The lines connecting the GW apparatuses in the drawing indicate logical connections built on the backbone networks.

A user can use the weather information service by connecting an information processing terminal 3 on which an application for using the weather information service is installed to any of the DP-GWs#1 to #4. The information processing terminal 3 is a device, such as a smart phone, cellular phone, tablet terminal, and PC, that is capable of displaying acquired information and communicating with the GW apparatuses. The information processing terminal 3 is not limited to a portable device and may be a stationary device. In the example illustrated in FIG. 9, it is assumed that the information processing terminal 3 used by a user is a smart phone.

Also, the communication between the information processing terminal 3 and the GW apparatus may be a direct connection using a short-range radio such as Wi-Fi (Wireless Fidelity) or a communication via a communication carrier such as 3G (third-generation mobile communication system) or LTE (Long Term Evolution).

The M2M-GWs#1 to #4 mutually connect the sensor networks and the backbone networks, and their function in the first embodiment is different from that of the DP-GWs#1 to #4 even though they are GW apparatuses. Thus, the M2M-GWs#1 to #4 will hereinafter be treated as having the same role as the information processing terminal 3. Hereinafter a GW apparatus 1 will indicate any of the DP-GWs#1 to #4, and a GW apparatus 3 will indicate any of the M2M-GWs#1 to #4. Also, the information processing terminal 3 will hereinafter include the M2M-GWs#1 to #4.

<Types of Messages>

A plurality of messages are used between the apparatuses of the information processing system 100. These messages are communicated with a protocol that utilizes the TCP (Transmission Control Protocol) at a higher layer (such as an application layer).

FIG. 10 is a diagram illustrating a format of a datagram of TCP. Because the format of a datagram of TCP is well-known, the detailed description of the format will be omitted. The messages used in the first embodiment are sent or received by being stored in the data of the TCP datagram.

FIG. 11 is a diagram illustrating one example of the types of the messages and a part of configuration information. The messages used in the first embodiment include a PUBLISH message, a QUERY message, a NOTIFY message, a REDIRECT message, a REQUEST message, and a DATA message.

The PUBLISH message is a message used for publishing content. The source IP address of the PUBLISH message is set to the IP address of an apparatus that generated the PUBLISH message. The destination IP address of the PUBLISH message is set to the IP address of an adjacent GW apparatus (DP-GW). The data unit of the PUBLISH message stores the name of content to be published and the value of the content.

The QUERY message is a message for requesting a search of content. The source IP address of the QUERY message is set to the IP address of an apparatus that generated the QUERY message. The destination IP address of the QUERY message is set to the IP address registered in link information, which will be described later. The data unit of the QUERY message stores the name of the content to be searched, a query ID, and a path history of the QUERY message. The query ID is given by the apparatus that generated the QUERY message as a unique value in the information processing system 100. Each apparatus relaying the QUERY message adds its own IP address to the path history of the QUERY message as the apparatus relays the QUERY message.

The NOTIFY message is a message used for giving notice of the information retention apparatus of the content which is search target of the QUERY message. The source IP address of the NOTIFY message is set to the IP address of an apparatus that generated the NOTIFY message. The destination IP address of the NOTIFY message is set to the source IP address of the corresponding QUERY message. The data unit of the NOTIFY message stores the name of the search target content, the corresponding query ID, and the IP address of the information retention apparatus of the search target content.

The REDIRECT message is a message used for giving notice of movement of an information retention apparatus. The source IP address of the REDIRECT message is set to the IP address of an apparatus that generated the REDIRECT message. The destination IP address of the REDIRECT message is set to the IP address of the query source apparatus (the apparatus that generated the QUERY message) indicated in the query list. The data unit of the REDIRECT message stores the name of the target content, the corresponding query ID, and the changed IP address of the information retention apparatus of the target content.

The REQUEST message is a message acquisition request for a content. The source IP address of the REQUEST message is set to the IP address of the apparatus that generated the REQUEST message. The destination IP address of the REQUEST message is set to the IP address of the information retention apparatus indicated in the query list. The data unit of the REQUEST message stores the name of the content to be acquired, the corresponding query ID, a request ID, and proxy function information. The request ID is given by the apparatus that generated the REQUEST message. The request ID may be the same as the query ID. When the query ID is used as the request ID, the request ID does not need to be included in the REQUEST message. The proxy function information is control information given from the apparatus that generated the REQUEST message to the information retention apparatus (mainly the apparatus that works as proxy). For example, the proxy function information includes information, such as proxy type identification information and parameter information of a proxy program, that is referenced by the information retention apparatus when the information retention apparatus works as a proxy server.

The DATA message is a message used for giving notice of acquisition target content of the REQUEST message. The source IP address of the DATA message is set to the IP address of the apparatus that generated the DATA message. The destination IP address of the DATA message is set to the source IP address of the corresponding REQUEST message. The data unit of the DATA message stores the name of the target content, the corresponding query ID, the request ID, a value of the target content, and control information. The request ID is acquired from the corresponding REQUEST message. If the REQUEST message does not include a request ID, the DATA message does not need to include a request ID because the apparatus that generated the REQUEST message used the value of the query ID as the value of the request ID. Or, the request ID may be set to the same value as the query ID. The control information is for the content to be given notice of with the DATA message and includes, for example, an effective time (lifetime) of the value of the content.

<Apparatus Configuration>

FIG. 12 is a diagram illustrating one example of a hardware configuration of the GW apparatus 1. The GW apparatus 1 includes a CPU (Central Processing Unit) 101, a RAM (Random Access Memory) 102, a ROM (Read Only Memory) 103, an auxiliary storage device 104, and a communication interface 105, all of which are electrically connected via a bus 106.

The communication interface 105 is an interface for inputting and outputting information to and from a network. The communication interface 105 includes a backbone network interface 105A and a local network interface 105B.

The backbone network interface 105A is connected to a backbone network and is an interface for other GW apparatus 1 (DP-GW). The backbone network interface 105A is, for example, a card having an optical communication interface or an NIC (Network Interface Card). The local network interface 105B is connected to a local network and is an interface for the information processing terminal 3 and the gateway apparatus 3 (M2M-GW). The local network interface 105B is, for example, an NIC. Or, the local network interface 105B may be a wireless communication card.

The auxiliary storage device 104 stores various programs and data used by the CPU 101 for executing each program. The auxiliary storage device 104 is, for example, a nonvolatile memory such as an EPROM (Erasable Programmable ROM) and a hard disc drive (Hard Disc Drive). The auxiliary storage device 104 retains, for example, an operating system (OS), an information processing module 5, and other various application programs. The information processing module 5 is a program for creating a query list, relaying a QUERY message and others, and controlling the operation as a proxy server, for example.

The RAM 102 is a semiconductor memory that provides a memory area and a work area for loading a program stored in the auxiliary storage device 104 and is used as a buffer or a cache. The RAM 102 may be volatile or nonvolatile.

The CPU 101 executes various processes by loading the OS and the information processing module 5, for example, retained in the auxiliary storage device 104 into the RAM 102. The number of the CPU 101 is not limited to one and may be plural.

The hardware configuration of the GW apparatus 1 is not limited to the one illustrated in FIG. 12 and may be changed appropriately on the basis of what product is used. For example, the GW apparatus 1 may include a removable recording medium driving device for reading a program from a removable recording medium such as a SD card.

Figure 13:
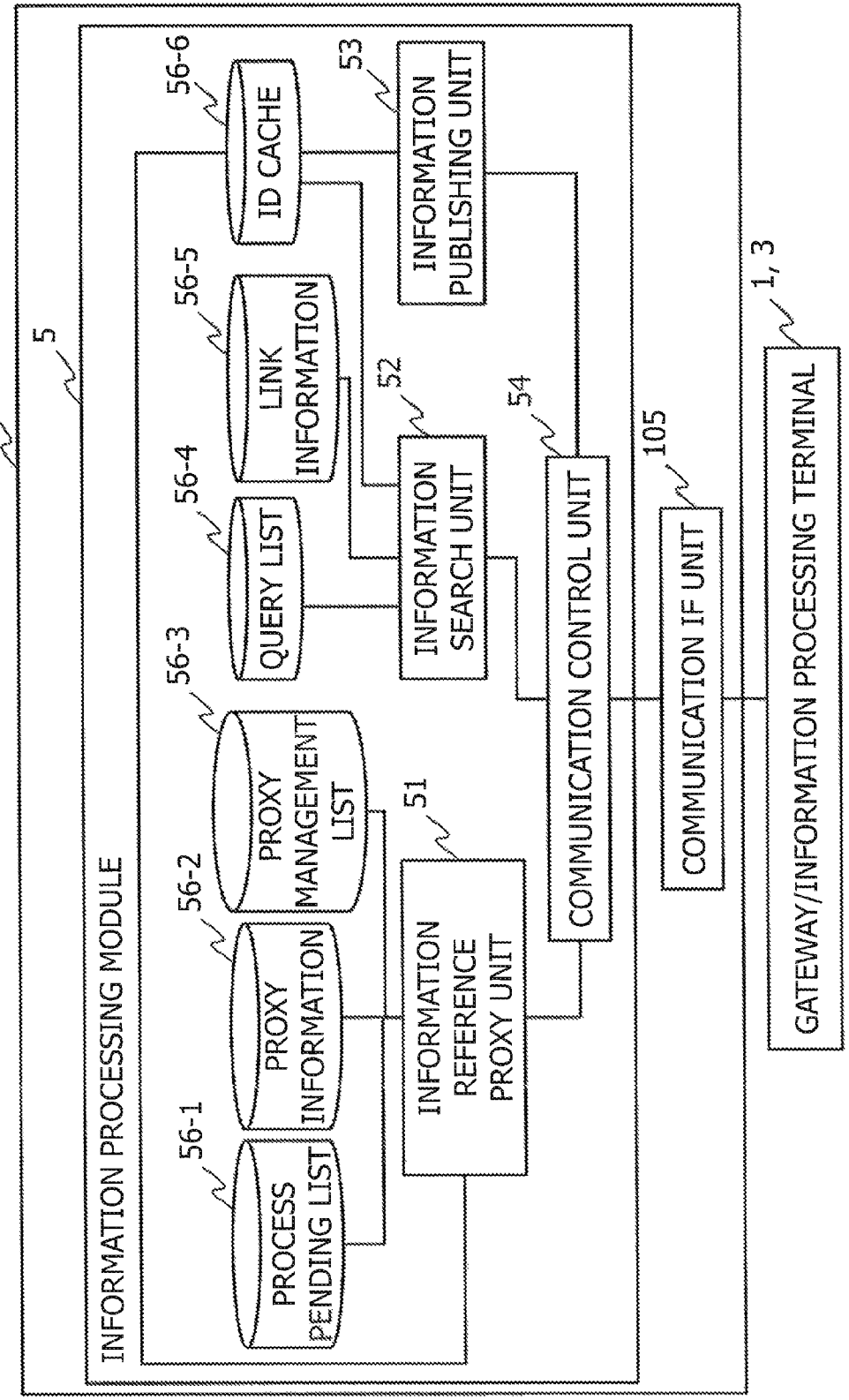
FIG. 13 is a diagram illustrating one example of a functional configuration of the GW apparatus (DP-GW) in the first embodiment.

FIG. 13 is a diagram illustrating one example of a functional configuration of the GW apparatus 1 in the first embodiment. The GW apparatus 1 includes an information reference proxy unit 51, an information search unit 52, an information publishing unit 53, a communication control unit 54, a process pending list 56-1, proxy information 56-2, a proxy management list 56-3, a query list 56-4, link information 56-5, and an ID cache 56-6. The information reference proxy unit 51, the information search unit 52, the information publishing unit 53, and the communication control unit 54 are functions achieved via execution of the information processing module 5 by the CPU 101. The process pending list 56-1, the proxy information 56-2, the proxy management list 56-3, the query list 56-4, the link information 56-5, and the ID cache 56-6 are created in a storage area of the RAM 102 or the auxiliary storage device 104 via the execution of the information processing module 5.

The communication control unit 54 controls communication between the backbone network interface 105A and the local network interface 105B and the information reference proxy unit 51, the information search unit 52, and the information publishing unit 53. More specifically, the communication control unit 54 has an area for a message send queue and a message reception queue (both of which are not illustrated) on the RAM 102.

The message reception queue stores a message that is received from an external apparatus via the backbone network interface 105A and the local network interface 105B and whose destination IP address is the IP address of the own apparatus. When a message is stored in the message reception queue, the communication control unit 54 assigns the message to either the information reference proxy unit 51, the information search unit 52, or the information publishing unit 53 on the basis of the type of the message.

For example, a PUBLISH message is assigned to the information publishing unit 53. A QUERY message, a NOTIFY message, and a REDIRECT message are assigned to the information search unit 52. A REQUEST message and a DATA message are assigned to the information reference proxy unit 51.

Upon receiving a PUBLISH message, the information publishing unit 53 records, for example, the content identification information and value of the content to be published to the ID cache 56-6 described below.

The information search unit 52 executes relay processing of a QUERY message, a NOTIFY message, and a REDIRECT message, for example, and manages the query list 56-4 and the link information 56-5 through the relay processing. The detailed processing of the information search unit 52 will be described later.

The information reference proxy unit 51 executes a process as a proxy server for the information processing terminal and the GW apparatus 1. The information reference proxy unit 51 also manages the process pending list 56-1, the proxy information 56-2, and the proxy management list 56-3. The information reference proxy unit 51 is invoked when the proxy mode is on (enabled). The configuration of the proxy mode is stored in the RAM 102, for example, and is done by an administrator of the information processing system 100. The detailed processing of the information reference proxy unit 51 will be described later.

Although being described in the first embodiment as a program, the information processing module 5 is not limited to a program and may be achieved with hardware such as LSI (Large Scale Integration) and FPGA (Field-Programmable Gate Array). The GW apparatus 1 is one example of a "node apparatus".

FIG. 14 is a diagram illustrating one example of the process pending list 56-1. The process pending list 56-1 is used by the information reference proxy unit 51 for temporarily recording the content of a REQUEST message, which is a request for acquiring the content, for processing the REQUEST message. The process pending list 56-1 is stored in the RAM 102, for example.

The process pending list 56-1 retains, for example, a request ID, a requester address, and proxy function information, and is searched by the request ID. The request ID is the one included in a REQUEST message. If an apparatus that generated a REQUEST message used a query ID as the request ID and the REQUEST message does not include the request ID, then the query ID of the REQUEST message is stored as the request ID in the process pending list 56-1. The source address of the REQUEST message is stored as the requester address. Proxy function information included in a REQUEST message received from another apparatus or proxy function information given by the own apparatus to a REQUEST message when the own apparatus generates the REQUEST message is stored as the proxy function information.

Figure 15:
FIG. 15 is a diagram illustrating one example of proxy information.

FIG. 15 is a diagram illustrating one example of the proxy information 56-2. The proxy information 56-2 is used by the information reference proxy unit 51 for referencing the configuration condition or the like of a proxy server when the information reference proxy unit 51 works as a proxy server for a REQUEST message. The proxy information 56-2 is preliminarily stored in the auxiliary storage device 104, for example.

The proxy information 56-2 includes, for example, proxy type identification information, an execution object, and a basic parameter, and is searched by proxy type identification information. The proxy type identification information is the identification information of a proxy function. The proxy type identification information includes, for example, a number that is preliminarily agreed among systems and the program name of the execution object. The execution object is the identification information of a program that executes a proxy process. The basic parameter is a parameter of the execution object. The execution object is one example of an "update unit".

FIG. 16 is a diagram illustrating one example of the proxy management list 56-3. The proxy management list 56-3 is used by the information reference proxy unit 51 when the information reference proxy unit 51 is working as a proxy server for managing a program of the proxy server. In other words, existence of an entry in the proxy management list 56-3 means that the own apparatus is working as a proxy server for some apparatus. The proxy management list 56-3 is stored in the RAM 102, for example.

The proxy management list 56-3 includes, for example, a proxy ID, an execution object, an execution parameter, an execution condition, and an execution state, and is searched by the proxy ID. The proxy ID is the identification information of a proxy function invoked in an apparatus. In the first embodiment, the name of queried content is used as the proxy ID. By using the name of queried content as the proxy ID, a link can be established to the query list 56-4. Not limited to this, any proxy ID may be given as long as the uniqueness of the proxy ID is ensured within an apparatus. The execution object is a program for executing a proxy process. The execution parameter is a parameter of the execution object. The execution condition is a condition for executing the execution object and is set in advance for the program that executes the proxy function. The execution state is information that indicates whether the execution object is in execution.

FIG. 17 is a diagram illustrating one example of the query list 56-4. The query list 56-4 retains information of a QUERY message which the information search unit 52 has received, sent, or relayed. The query list 56-4 is stored in the RAM 102, for example.

The query list 56-4 includes, for example, a name of queried content, a query ID, a query requester IP address, a query destination IP address, and an IP address of the information retention apparatus, and is searched by the name of queried content. The name of queried content and the query ID are those included in a QUERY message. The query requester IP address is a source IP address of a QUERY message. The query destination IP address is a destination IP address of a QUERY message and is acquired from the link information, which will be described later. If the own apparatus retains the queried content of a QUERY message, the query destination IP address is set to the IP address of the own apparatus. The IP address of the information retention apparatus is acquired from a NOTIFY message or a REDIRECT message. If the own apparatus is the apparatus that generated the content queried with a QUERY message, however, the IP address of the own apparatus is stored as the IP address of the information retention apparatus.

An entry in the query list 56-4 is deleted by the information search unit 52 when a predetermined time has elapsed without a REQUEST message having the same query ID as the entry being receiving by the information search unit 52, or when a disconnection request is received from a query requester apparatus.

Figure 18:
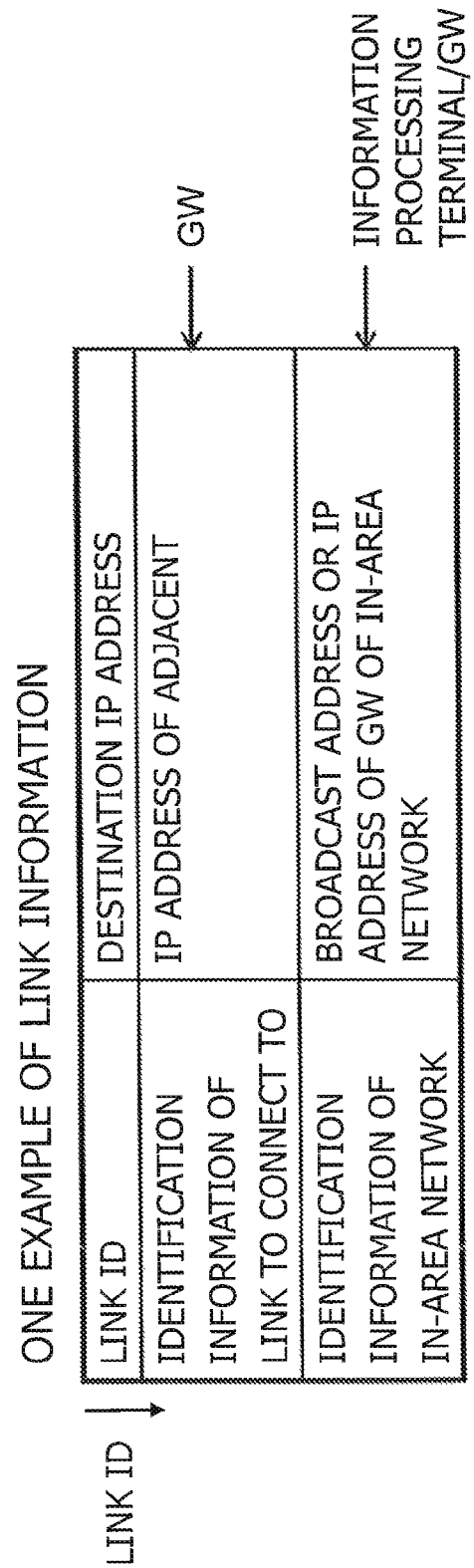
FIG. 18 is a diagram illustrating one example of link information.

FIG. 18 is a diagram illustrating one example of the link information 56-5. The link information 56-5 retains an IP address of an adjacent GW apparatus 1, and is used for relaying a QUERY message to the adjacent apparatus connected via a network. The link information 56-5 is stored in the auxiliary storage device 104, for example.

The link information 56-5 includes a link ID and a destination IP address and is searched by the link ID. The link ID is an identifier of a link to connect to. The destination IP address is a destination IP address of the link to connect to.

For example, in the case of the GW apparatus 1, the link information 56-5 retains the link ID of a network to connect to, and the IP address of an adjacent GW apparatus 1 via the network as the destination IP address. The GW apparatus 1 also retains the link ID of a local network to connect to, and a broadcast address of the local network as the destination IP address. In the case of the information processing terminal 3, the link information 56-5 retains the link ID of an in-area network of the terminal, and a broadcast address of the in-area network or the IP address of a GW apparatus 1 connected to the network as the destination IP address. The information stored in the link information is acquired from routing information, for example.

FIG. 19 is a diagram illustrating one example of the ID cache 56-6. The ID cache 56-6 is used by the information reference proxy unit 51, the information search unit 52, and the information publishing unit 53 for recording and referencing content. The ID cache 56-6 is stored in the auxiliary storage device 104, for example. The GW apparatus 1 works as a cache server by retaining information in the ID cache 56-6. The ID cache 56-6 contains a name of queried content, a value of the content, and control information. The control information is the one stored in a DATA message.

Figure 20:
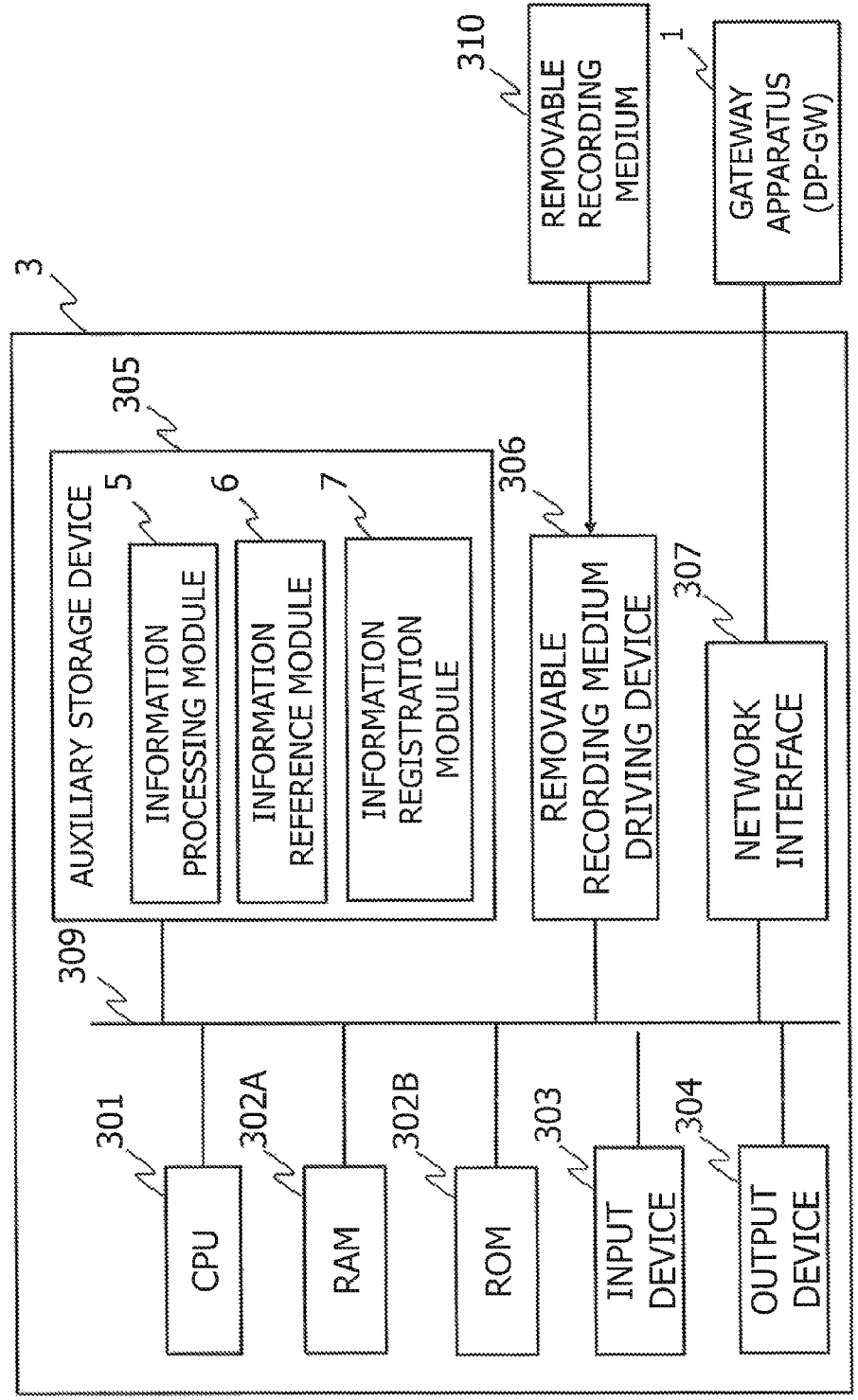
FIG. 20 is a diagram illustrating one example of a hardware configuration of an information processing terminal.

FIG. 20 is a diagram illustrating one example of a hardware configuration of the information processing terminal 3. The information processing terminal 3 includes a CPU 301, a RAM 302A, an input device 303, an output device 304, an auxiliary storage device 305, a removable recording medium driving device 306, and a network interface 307. These are electrically connected to each other via a bus 309.

The input device 303 is a touch panel, an operation button, or the like. Data input from the input device 303 is output to the CPU 301.

The removable recording medium driving device 306 reads a program or various data recorded in a removable recording medium 410 and outputs them to the CPU 301. The removable recording medium 410 is a recording medium such as a SD card, a miniSD card, a microSD card, a USB (Universal Serial Bus) flash memory.

The network interface 307 is an interface for inputting and outputting information to and from a network. The network interface 307 is an interface connected to a wireless network, for example, and is an electric circuit including an antenna. The network interface connects to the GW apparatus 1 (DP-GW), for example. Data or the like received by the network interface 307 is output to the CPU 301.

The auxiliary storage device 305 stores various programs and data used by the CPU 301 for executing each of the programs. The auxiliary storage device 305 is a nonvolatile memory such as an EPROM or an HDD. The auxiliary storage device 305 retains an OS, the information processing module 5, an information reference module 6, an information registration module 7, and other various application programs. The information reference module 6 is a program for searching and acquiring content. The information processing module 5 is a program for executing processing of publishing of content.

The RAM 302A is a semiconductor memory that provides a storage area and a work area for loading a program stored in the auxiliary storage device 305 and that is used as a buffer. The RAM 302A may be volatile or nonvolatile.

The CPU 301 performs various processing by loading and executing an OS and various programs retained in the auxiliary storage device 305 or the removable recording medium 410 to the RAM 302A. The number of the CPU 301 is not limited to one and may be plural.

The output device 304 outputs the result of processing executed by the CPU 301. The output device 304 may be a display or an audio output device such as a speaker, for example.

The hardware configuration of the information processing terminal 3 illustrated in FIG. 20 is intended for a smart phone, and a hardware configuration of the information processing terminal 3 is not limited to this configuration. For example, depending on an apparatus used as the information processing terminal 3, the removable recording medium may be a CD (Compact Disc), a DVD (Digital Versatile Disc), a Blu-ray® Disc, or a flash memory card.

In the case of the GW apparatus 3 (M2M-GW), the input device 303 and the output device 304 do not need to be included. In the case of the GW apparatus 3, the network interface 307 includes an interface connected to a sensor network and an interface connected to a network to which the GW apparatus 1 (DP-GW) is connected.

Also, the information processing terminal 3 may selectively include any of the information processing module 5, the information reference module 6, and the information registration module 7 depending on its purpose of publishing or referencing information. A CPU, a RAM, and an auxiliary storage device for executing each module may be provided for each module.

Figure 21:
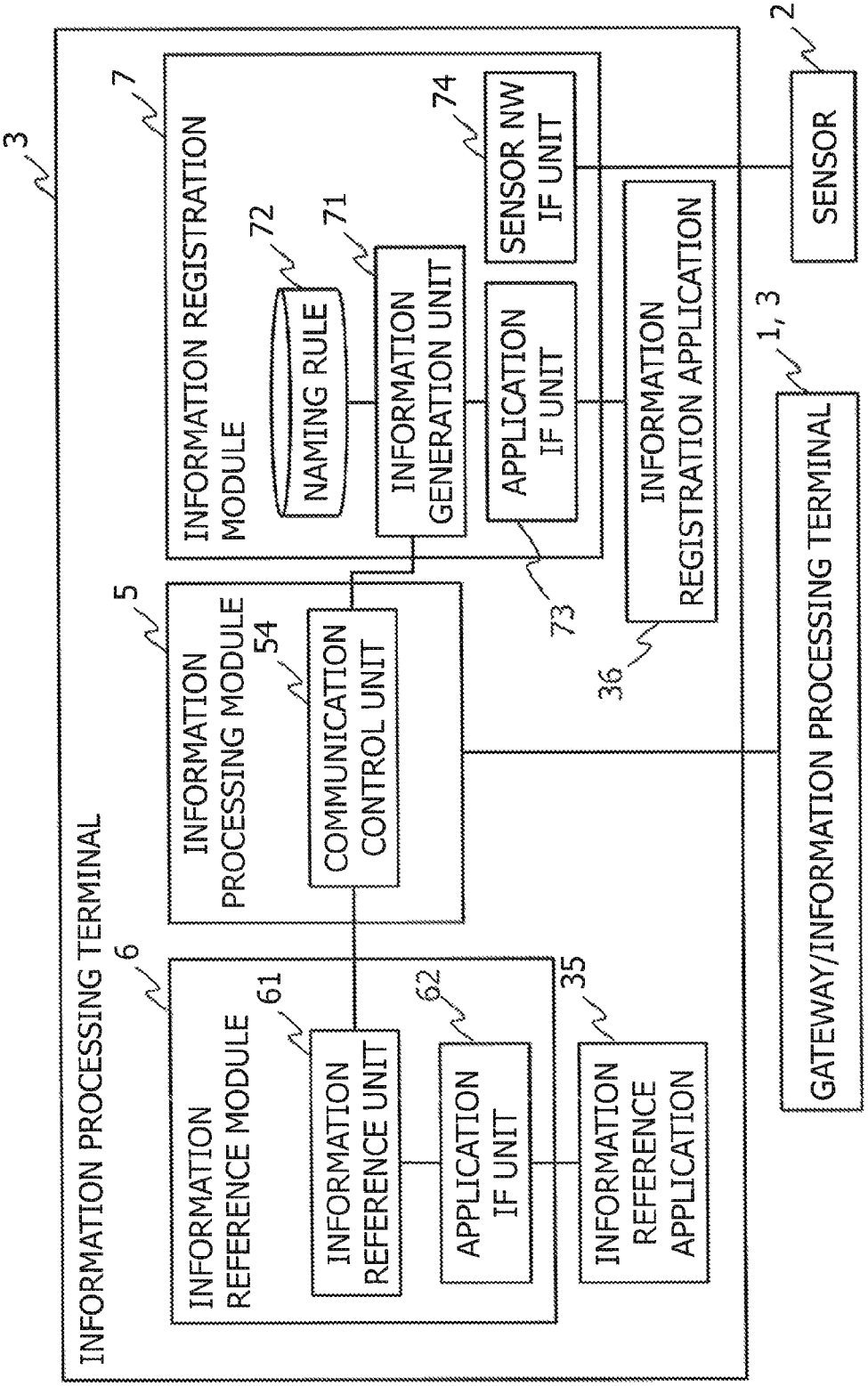
FIG. 21 is a diagram illustrating one example of a functional configuration of an information processing terminal or a GW apparatus (M2M-GW)

FIG. 21 is a diagram illustrating one example of a functional configuration of the information processing terminal 3 or the GW apparatus 3. The information processing terminal 3 includes the information processing module 5, the information reference module 6, and the information registration module 7. The information processing module 5 is as described above and thus will not be described. Also, the functional configuration of the information processing module 5 is omitted in FIG. 21.

The information processing terminal 3 achieves the function of an information reference unit 61 and an application interface unit 62 by the CPU 301 executing the information reference module 6.

The information reference unit 61 manages the application interface unit 62 and communicates with the communication control unit 54 of the information processing module 5 via a message reception queue and socket communication of TCP/IP. The application interface unit 62 is an API (Application Programming Interface) for communicating with an information reference application 35. In the first embodiment, the information reference application 35 is an application for using a weather information service, for example.

The information reference unit 61 stores a QUERY message and a REQUEST message in the message reception queue of the communication control unit 54 in accordance with an information acquisition request from the information reference application 35, for example. The information reference unit 61 also receives a DATA message or the like from the communication control unit 54 in response to a QUERY message and a REQUEST message and returns information to the information reference application 35 via the application interface unit 62. The detail of the processing of the information reference unit 61 will be described later.

The information processing terminal 3 achieves the function of an information generation unit 71, an application interface unit 73, and a sensor network interface unit 74 as the CPU 301 executes the information registration module 7. Also, installing the information registration module 7 stores a naming rule list 72 in a storage area of the auxiliary storage device 305.

The information generation unit 71 manages the application interface unit 73 and communicates with the communication control unit 54 of the information processing module 5 via a message reception queue and socket communication of TCP/IP. The application interface unit 73 is an API for communicating with an information registration application 36. The information registration application 36 is an application such as Twitter, for example.

Also, the information generation unit 71 manages the sensor network interface unit 74. The sensor network interface unit 74 receives a value of content from the sensor 2. The information generation unit 71 gives data received from the information registration application 36 or the sensor 2 a name that is unique in a network by referencing the naming rule list 72, generates a PUBLISH message, and gives notice to the information processing module 5.

Figure 22:
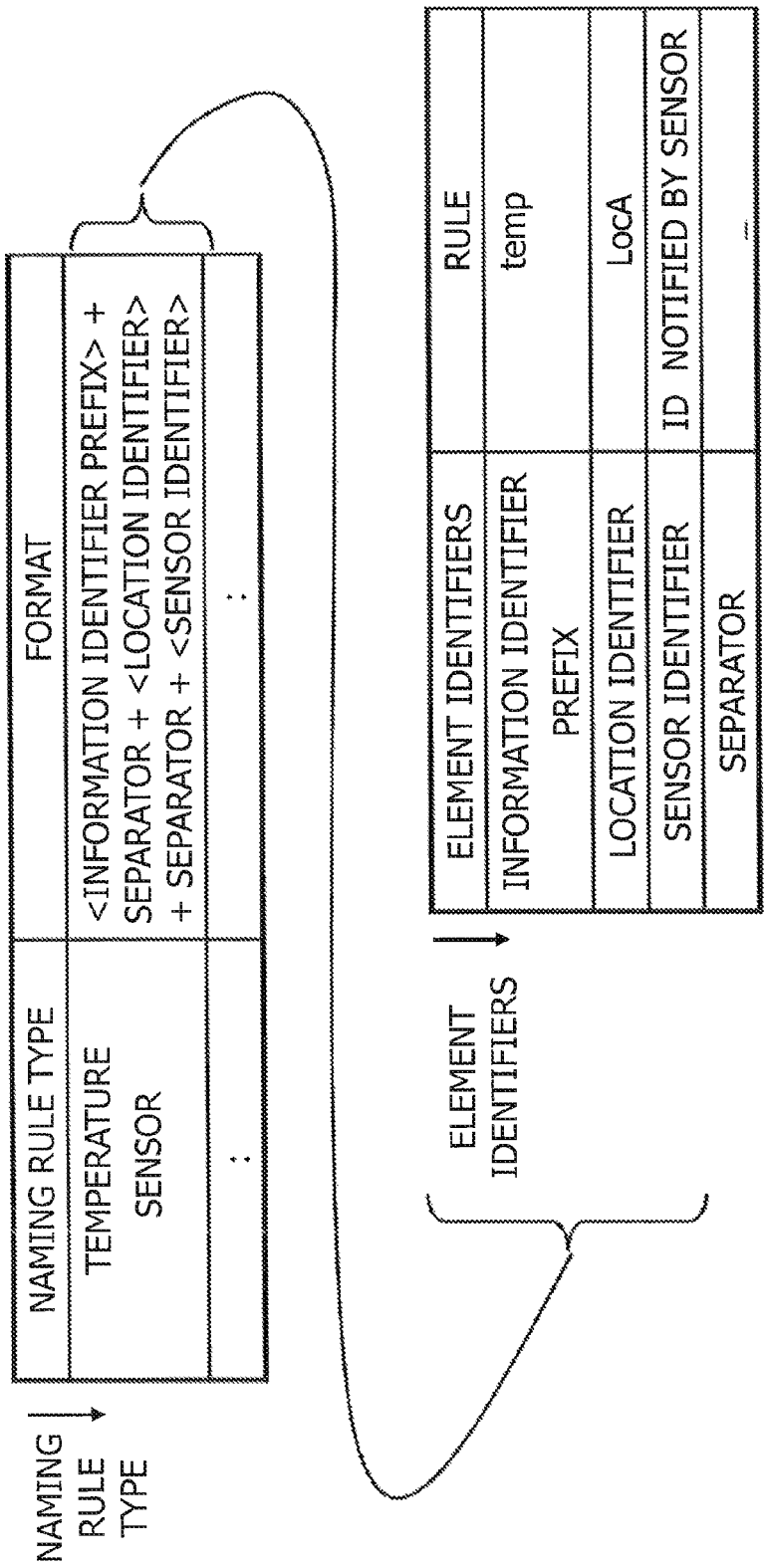
FIG. 22 is a diagram illustrating one example of a naming rule list.

FIG. 22 is a diagram illustrating one example of the naming rule list 72. The naming rule list 72 stores naming rules for giving identification information (content name) that is unique in a network to data received from the information registration application 36 or the sensor 2.

The naming rule list 72 includes a naming rule type and a format. Each naming rule stores element identifiers and rules. For example, in the case of giving a content name to data from a temperature sensor, an entry in the naming rule list is as follows.

The entry stores "temperature sensor" as a naming rule type and <information identifier prefix>+separator+<location identifier>+separator+<sensor identifier> as a format. The element identifiers of this format are <information identifier prefix>, <location type>, <sensor type>, and a separator. The rules of the element identifiers are: <information identifier prefix>="temp", <location type>="LocA", <sensor identifier>=ID notified by a sensor, and the separator="_". In this case, the name of information uniquely published in a network in relation with data notified by a temperature sensor sensor001 is "tempLocA_LocA_sensor001".

<Flow of Processing>

Figure 23:
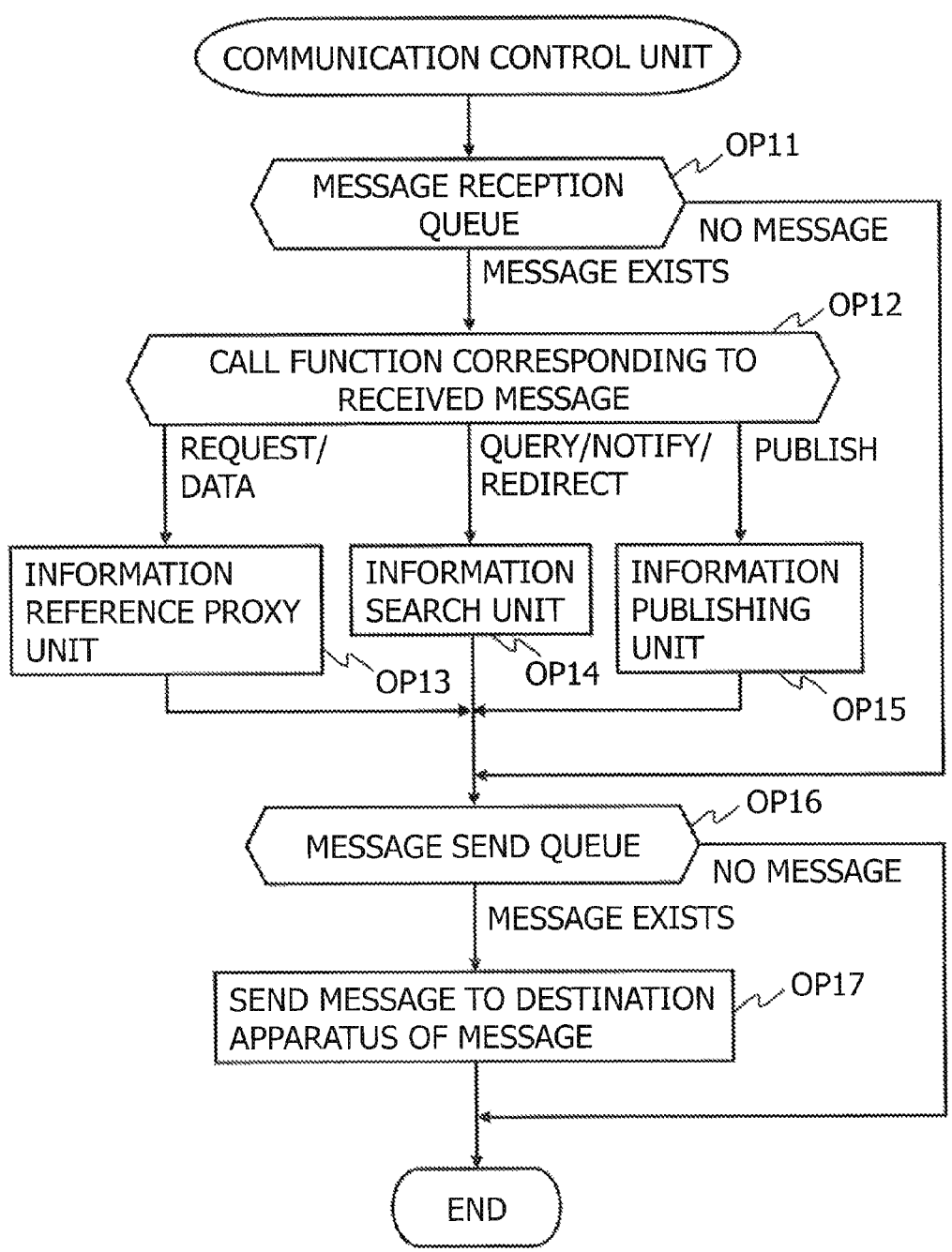
FIG. 23 is one example of a flowchart of the process of a communication control unit of an information processing module.

FIG. 23 is one example of a flowchart of a process of the communication control unit 54 of the information processing module 5. The flowchart illustrated in FIG. 23 starts as the information processing module 5 is invoked and is repeated while the information processing module 5 is running.

In OP11, the communication control unit 54 periodically monitors the message reception queue. The message reception queue stores a message that is analyzed by the communication control unit 54 from communication data received from another apparatus and whose destination is the IP address of the own apparatus. The message reception queue also stores a message generated by a program within the own apparatus. If the message reception queue stores a message (OP11: MESSAGE EXISTS), the process proceeds to OP12. If the message reception queue does not store a message (OP11: NO MESSAGE), the process proceeds to OP16.

In OP12, the communication control unit 54 analyzes the type of the message stored in the message reception queue. If the message in the message reception queue is a REQUEST message or a DATA message, the process proceeds to OP13. In OP13, the communication control unit 54 passes the message to the information reference proxy unit 51 and invokes the information reference proxy unit 51. The process then proceeds to OP16.

If the message in the message reception queue is a QUERY message, a NOTIFY message, or a REDIRECT message, the process proceeds to OP14. In OP14, the communication control unit 54 passes the message to the information search unit 52 and invokes the information search unit 52. The process then proceeds to OP16.

If the message in the message reception queue is a PUBLISH message, the process proceeds to OP15. In OP15, the communication control unit 54 passes the message to the information publishing unit 53 and invokes the information publishing unit 53. The process then proceeds to OP16.

In OP16, the communication control unit 54 determines whether another apparatus or a program in the apparatus has stored a message in the message send queue. The message send queue stores a message from the information reference proxy unit 51 and the information search unit 52. If the message send queue does not store a message (OP16: NO MESSAGE), the process illustrated in FIG. 23 ends.

If the message send queue stores a message (OP16: MESSAGE EXISTS), the process proceeds to OP17. In OP17, the communication control unit 54 sends the message to a destination apparatus indicated with the destination IP address of the message. If the destination IP address of the message is an internal program, the communication control unit 54 sends the message to a corresponding socket. The process illustrated in FIG. 23 then ends.

Figure 24:
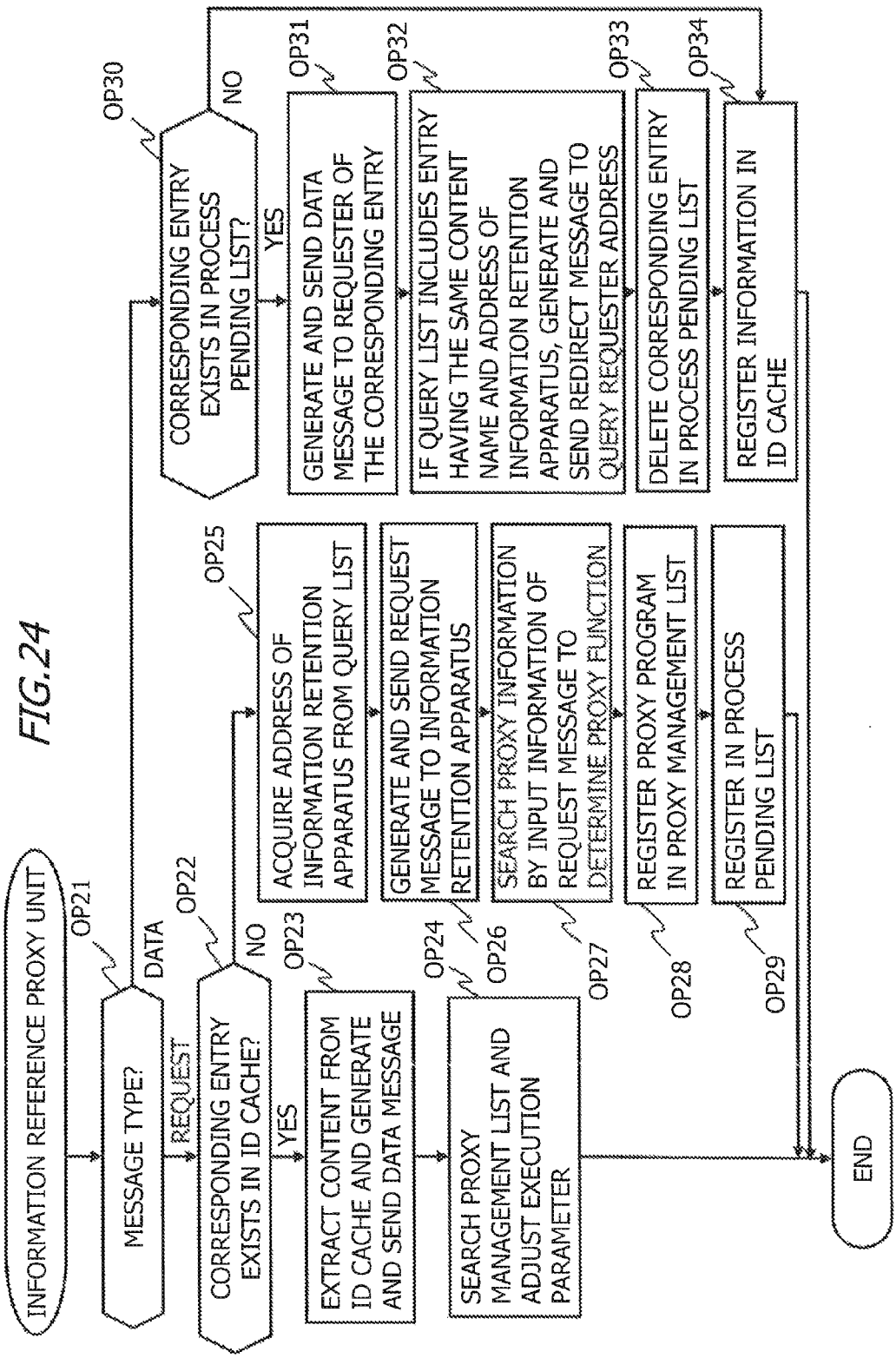
FIG. 24 is one example of a flowchart of the process of an information reference proxy unit of an information processing module.

FIG. 24 is one example of a flowchart of a process of the information reference proxy unit 51 of the information processing module 5. The process illustrated in FIG. 24 starts when the information reference proxy unit 51 receives a REQUEST message or a DATA message from the communication control unit 54.

In OP21, the information reference proxy unit 51 determines a type of a message. If the message is a REQUEST message, the process proceeds to OP22. If the message is a DATA message, the process proceeds to OP30.

OP22 to OP29 are a process for the case in which the information reference proxy unit 51 receives a REQUEST message. In OP22, the information reference proxy unit 51 extracts a name of content to be acquired that is included in a REQUEST message and searches the ID cache 56-6. If the content name is recorded in the ID cached 56-6 (OP22: YES), this means that the information reference proxy unit 51 already retains the requested content and is working as a proxy server for some apparatus. The process then proceeds to OP23.

In OP23, the information reference proxy unit 51, which already retains the requested content and is working as a proxy server, executes a process for responding to the received REQUEST message as a proxy server. Specifically, the information reference proxy unit 51 extracts the content from the ID cache 56-6, generates a DATA message, and stores the DATA message in the message send queue of the communication control unit 54. The DATA message is then sent to the apparatus that sent the received REQUEST message. The process then proceeds to OP24.

In OP24, the information reference proxy unit 51 extracts the content name from the received REQUEST message and searches the proxy management list 56-3. The information reference proxy unit 51 compares proxy information included in the received REQUEST message with a proxy execution parameter of a corresponding entry in the proxy management list 56-3. If anything has changes, the information reference proxy unit 51 updates the execution parameter in the proxy management list 56-3. Then the process illustrated in FIG. 24 ends.

In OP22, if the content name included in the received REQUEST message is not recorded in the ID cache 56-6 (OP22: NO), this means that the information reference proxy unit 51 has informed that the information reference proxy unit 51 itself is the information retention apparatus of the target content but actually does not retain the content. The process then proceeds to OP25.

OP25 to OP29 are a process for the information reference proxy unit 51 to work as a proxy server of the target content. In OP25, the information reference proxy unit 51 searches the query list 56-4 by the content name extracted from the REQUEST message and acquires the IP address of the information retention apparatus of the content. The process then proceeds to OP26.

In OP26, the information reference proxy unit 51 generates a REQUEST message destined for the acquired IP address of the information retention apparatus and stores the message in the message send queue of the communication control unit 54. This REQUEST message is sent to the information retention apparatus by the communication control unit 54. The process then proceeds to OP27.

In OP27, the information reference proxy unit 51 extracts the proxy type identification information from the proxy function information included in the received REQUEST message, searches the proxy information 56-2, and identifies a proxy function. The process then proceeds to OP28.

In OP28, the information reference proxy unit 51 acquires an execution parameter of an execution object from the parameter information included in the proxy function information of the received REQUEST message or from basic parameters included in the proxy information 56-2. The information reference proxy unit 51 registers the execution object of the proxy function identified from the proxy information 56-2 along with the proxy ID given for administration to the proxy management list 56-3. The process then proceeds to OP29.

In OP29, the information reference proxy unit 51 registers a request ID, a requester address, and proxy information acquired from the REQUEST message to the process pending list 56-1. This enables the information reference proxy unit 51 to continuously process the REQUEST message while receiving a succeeding DATA message. The process illustrated in FIG. 24 then ends.

OP30 to OP34 are a process for the case in which the information reference proxy unit 51 receives a DATA message. In OP30, the information reference proxy unit 51 extracts a request ID included in the DATA message and searches the process pending list 56-1 by the request ID.

If the corresponding entry exists in the process pending list 56-1 (OP30: YES), this means that the response to the apparatus that originally sent a REQUEST message has not finished yet. The process then proceeds to OP31. In OP31, the information reference proxy unit 51 generates a DATA message whose destination IP address is set to the requester IP address of the entry and stores the DATA message in the message send queue of the communication control unit 54. This allows the requested content to be sent to the apparatus that originally sent the REQUEST message. The process then proceeds to OP32.

In OP32, the information reference proxy unit 51 searches the query list 56-4 by a content name included in the DATA message. If an entry including the same content name and the IP address of the information retention apparatus exists, the information reference proxy unit 51 generates a REDIRECT message whose destination is the query requester IP address of the entry and stores the REDIRECT message in the message send queue of the communication control unit 54. This notifies the apparatus that is the destination of the REDIRECT message that the information retention apparatus of the target content has changed to the own apparatus. If an entry including the same content name and the IP address of the information retention apparatus does not exist, a REDIRECT message is not generated. The process then proceeds to OP33.

In OP33, the information reference proxy unit 51 deletes the entry of the process pending list 56-1. The process then proceeds to OP34.

In OP34, the information reference proxy unit 51 registers the content name and the control information included in the DATA message to the ID cache 56-6. This makes the apparatus work as a cache server for the content. The process illustrated in FIG. 24 then ends. One example of the control information is an effective period or reference permission of this content.

Figure 25:
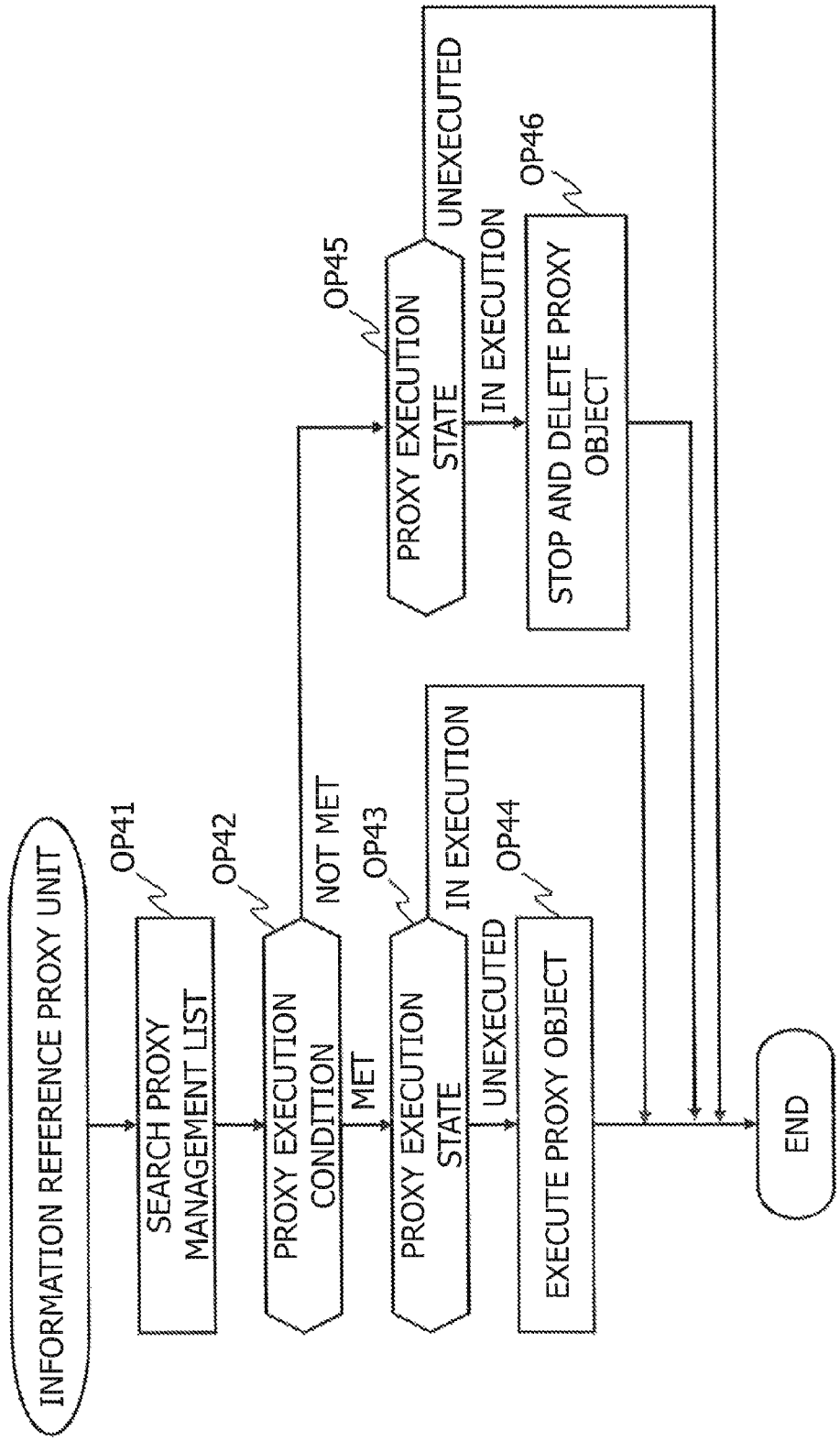
FIG. 25 is one example of a flowchart of a proxy execution process of an information reference proxy unit.

FIG. 25 is one example of a flowchart of a proxy execution process of the information reference proxy unit 51. Apart from processing a message illustrated in FIG. 24, the information reference proxy unit 51 periodically executes a process of managing the operation of a proxy. Specifically, this process is implemented as a cycle program that is invoked by a scheduler.

In OP41, the information reference proxy unit 51 extracts an entry from the proxy management list 56-3 in a predetermined cycle. The process then proceeds to OP42.

In OP42, the information reference proxy unit 51 checks a proxy execution condition of the entry. For example, the execution condition is that the number of entries in the query list 56-4 having the same proxy ID (in the first embodiment, a proxy ID is a name of queried content) as the extracted entry is a predetermined number, or a cycle of acquiring content. If the proxy execution condition is met (OP42: MET), the process proceeds to OP43.

In OP43, the information reference proxy unit 51 checks a proxy execution state of the entry. If the proxy execution state of the entry is unexecuted (OP43:UNEXECUTED), the process proceeds to OP44.

In OP44, the information reference proxy unit 51 invokes an execution object included in the entry of the proxy management list 56-3 with an execution parameter included in the entry, and set the execution state of the entry of the proxy management list 56-3 to in execution. The process illustrated in FIG. 25 then ends.

In OP43, if the proxy execution condition of the entry in the proxy management list 56-3 is met and the proxy execution state of the entry is being executed (OP43: IN EXECUTION), the process illustrated in FIG. 25 then ends.

In OP42, if the proxy execution condition of the entry of the proxy management list 56-3 is not met (OP42: NOT MET), the process proceeds to OP45. In OP45, the information reference proxy unit 51 checks the proxy execution condition of the entry. If the proxy condition of the entry is in execution (OP45: IN EXECUTION), the process proceeds to OP46. If the proxy condition of the entry is unexecuted (OP45: UNEXECUTED), the process illustrated in FIG. 25 ends.

In OP46, the information reference proxy unit 51 stops and deletes the execution object and sets the execution state of the entry of the proxy management list 56-3 to unexecuted. The process illustrated in FIG. 25 then ends.

When a predetermined time has elapsed since the execution state of an entry in the proxy management list 56-3 became unexecuted, the entry is deleted from the proxy management list 56-3 by the information reference proxy unit 51. Deleting an entry from the proxy management list 56-3 ends the proxy process for the target content of the entry. Along with this, the entry of the target content is deleted from the ID cache 56-6. Also, in this case, if an entry of an apparatus referencing the target content exists in the query list 56-4, the information search unit 52 sends a REDIRECT message to the apparatus.

For example, if the proxy execution condition is that a predetermined number of entries requesting the target content exist in the query list 56-4, the entries are deleted from the proxy management list 56-3 and the proxy process for the target content ends when the number of the entries in the query list 56-4 becomes less than the predetermined number. The target content is also deleted from the ID cache 56-6. In this case, if an entry for the target content exists in the query list 56-4, the information search unit 52 sends a REDIRECT message to a query requester apparatus. In this case, the IP address of an information retention apparatus notified with the REDIRECT message is the IP address of the apparatus that generated the target content, for example.

Figure 26A:
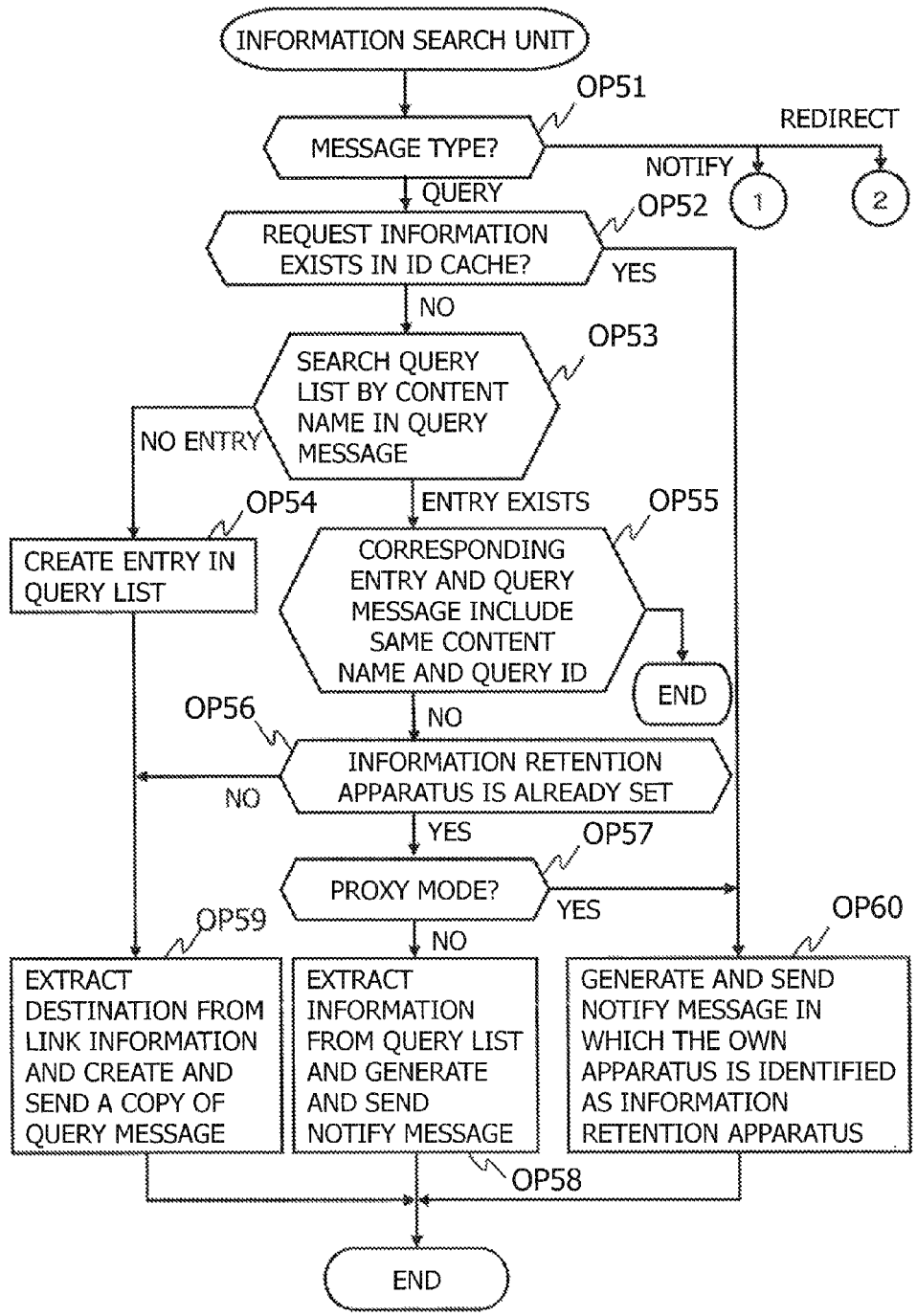
FIG. 26A is one example of a flowchart of the process of an information search unit of an information processing module.
Figure 26B:
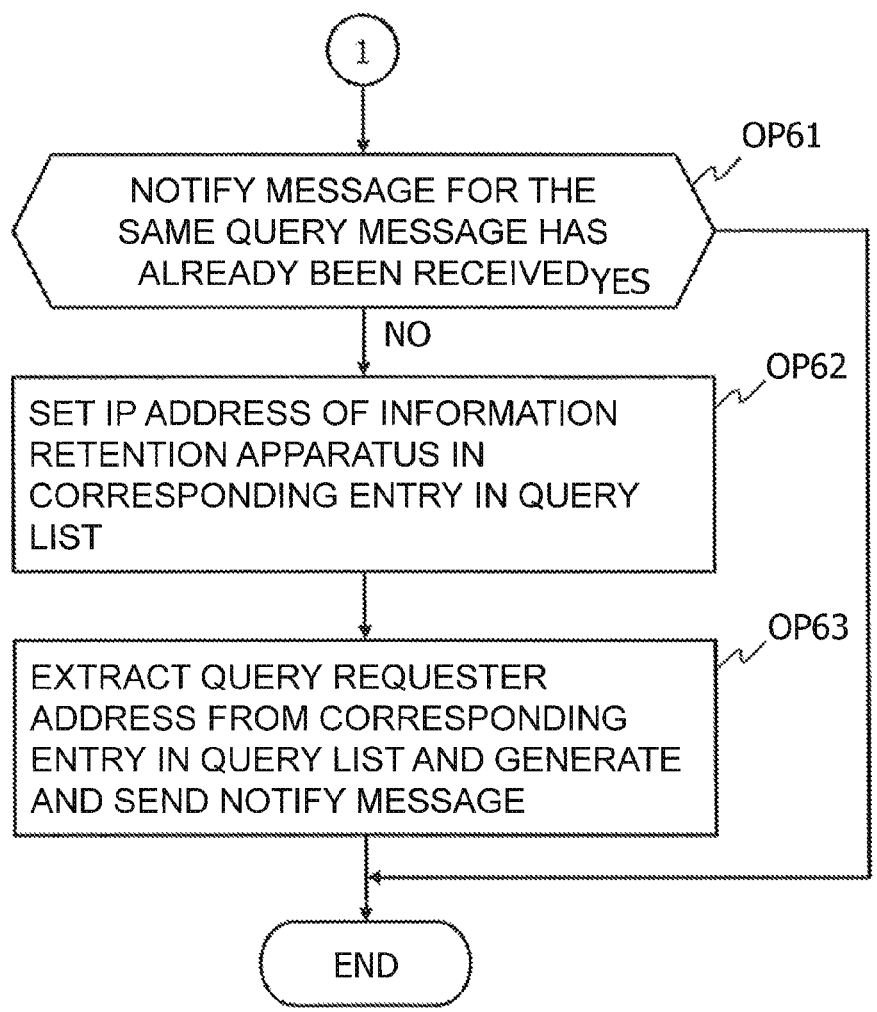
FIG. 26B is one example of a flowchart of the process of an information search unit of an information processing module.
Figure 26C:
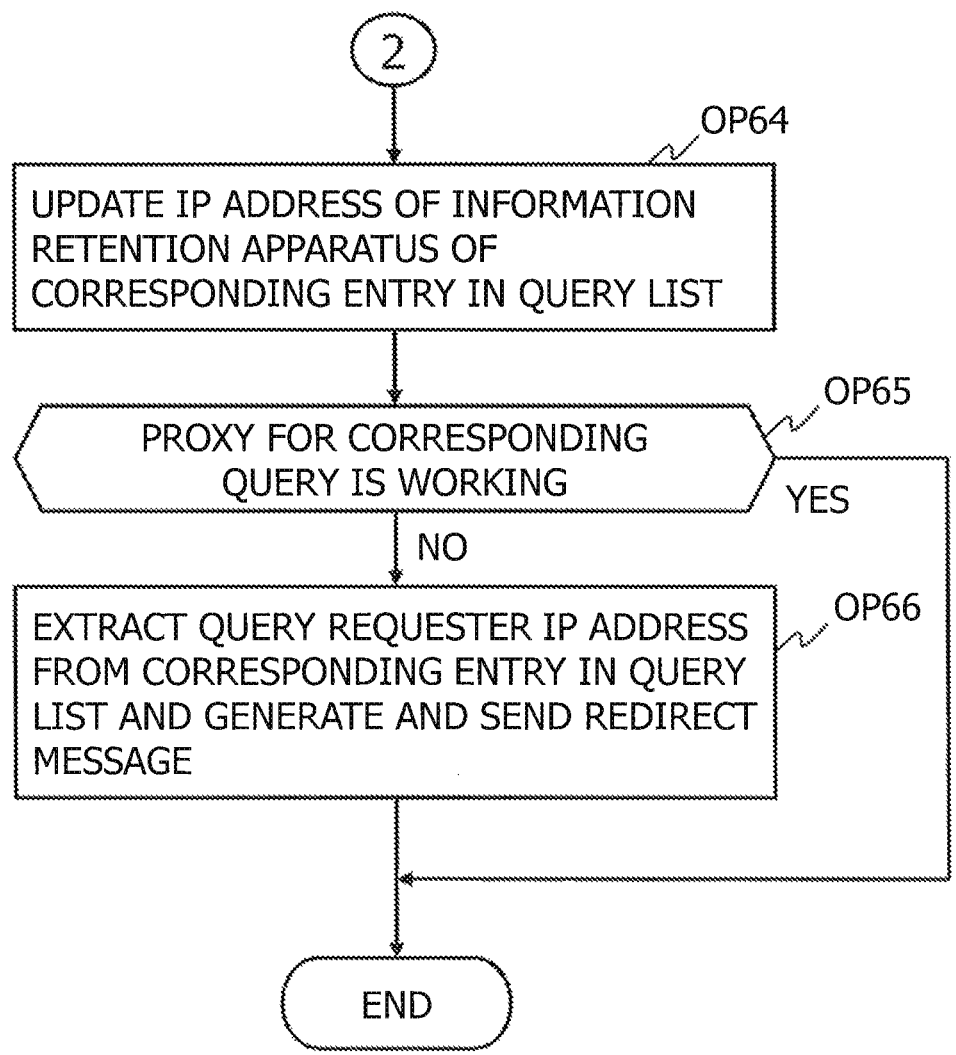
FIG. 26C is one example of a flowchart of the process of an information search unit of an information processing module.

FIGS. 26A, 26B, and 26C are one example of a flowchart of a process of the information search unit 52 of the information processing module 5. The flowchart illustrated in FIGS. 26A, 26B, and 26C are started when the information search unit 52 receives a QUERY message, a NOTIFY message, or a REDIRECT message from the communication control unit 54.

In OP51, the information search unit 52 determines the type of a received message. If the message is a QUERY message, the process proceeds to OP52. If the message is a NOTIFY message, the process proceeds to OP61 in FIG. 26B. If the message is a REDIRECT message, the process proceeds to OP64 in FIG. 26C.

OP52 to OP60 are a process for the case in which the information search unit 52 receives a QUERY message. In OP52, the information search unit 52 extracts a content name from the QUERY message and searches a corresponding entry in the ID cache 56-6. If the corresponding entry exists in the ID cache 56-6 (OP52: YES), this means that the own apparatus is the information retention apparatus and the process proceeds to OP60. In OP60, the information search unit 52 generates a NOTIFY message whose destination IP address and IP address of an information retention apparatus are set to the source IP address of the QUERY message and the IP address of the own apparatus, respectively, and stores the NOTIFY message in the message send queue of the communication control unit 54. The process in FIG. 26A then ends.

If the corresponding entry does not exist in the ID cache 56-6 (OP52: NO), the process proceeds to OP53. In OP53, the information search unit 52 searches the query list 56-4 by the content name extracted from the QUERY message. If a corresponding entry does not exist in the query list 56-4 (OP53: NO ENTRY), the process proceeds to OP54.

In OP54, the information search unit 52 creates an entry of the received QUERY message in the query list 56-4. The process then proceeds to OP59. In OP59, the information search unit 52 acquires all destination IP addresses registered in the link information 56-5 as destinations of the QUERY message in order to send the received QUERY message to a next apparatus. The information search unit 52 generates a copy of the received QUERY message to the all destination IP addresses acquired from the link information 56-5. The destination of each QUERY message is each destination IP address in the link information 56-5. The information search unit 52 stores the QUERY messages in the message send queue of the communication control unit 54. The process illustrated in FIG. 26A then ends.

In OP53, if an entry corresponding to the content name extracted from the QUERY message exists in the query list 56-4 (OP53: ENTRY EXISTS), the process proceeds to OP55.

In OP55, the information search unit 52 determines whether the content name and the query ID of the corresponding entry in the query list 56-4 are the same as those of the received QUERY message. If the content name and the query ID of the corresponding entry in the query list 56-4 are the same as those of the received QUERY message (OP55: YES), the process illustrated in FIG. 26A ends without any further processing because the corresponding QUERY message is already in processing. This avoids looping of a QUERY message.

If the content name of the corresponding entry in the query list 56-4 is the same as that of the received QUERY message but the query ID of the corresponding entry is not the same as that of the received QUERY message (OP55: NO), this means that the corresponding QUERY message has not been processed. The process then proceeds to OP56.

In OP56, the information search unit 52 determines whether the corresponding entry in the query list 56-4 includes the IP address of the information retention apparatus. If the corresponding entry in the query list 56-4 includes the IP address of the information retention apparatus (OP56: YES), the process proceeds to OP57.

In OP57, the information search unit 52 determines whether the proxy mode is set. If the proxy mode is set (OP57: YES), the process proceeds to OP60. In OP60, the information search unit 52 generates a NOTIFY message whose destination IP address is the source IP address of the QUERY message and whose IP address of an information retention apparatus is the IP address of the own apparatus, and stores the NOTIFY message in the message send queue of the communication control unit 54. The process illustrated in FIG. 26A then ends.

If the proxy mode is not set (OP57: NO), the process proceeds to OP58. In OP58, the information search unit 52 generates a NOTIFY message on the basis of the corresponding entry in the query list 56-4 and stores the NOTIFY message in the message send queue of the communication control unit 54. The process illustrated in FIG. 26A then ends.

In OP56, if the corresponding entry in the query list 56-4 does not include the IP address of the information retention apparatus (OP56: NO), the process proceeds to OP59 for acquiring the IP address of the information retention apparatus for the corresponding entry in the query list 56-4. In OP59, the information search unit 52 sends a copy of the QUERY message to all destination IP addresses registered in the link information 56-5. The process illustrated in FIG. 26A then ends.

OP61 to OP63 in FIG. 26B are a process for the case in which the information search unit 52 receives a NOTIFY message.

In OP61, the information search unit 52 determines whether a NOTIFY message corresponding to the QUERY message having a same query ID has already been received. This determination is done by determining whether the IP address of the information retention apparatus is set in the query ID included in the received NOTIFY message and in the entry in the query list 56-4.

If a NOTIFY message corresponding to the QUERY message having a same query ID has already been received (OP61: YES), the process illustrated in FIG. 26B ends. This is done because sending a copy of the QUERY message to a plurality of apparatuses, as with the OP59 illustrated in FIG. 26A, could cause receiving a plurality of NOTIFY messages having a same query ID. In the first embodiment, an initially received NOTIFY message is treated as effective. But it is also possible to cache received NOTIFY messages for a certain period of time, select one of the NOTIFY messages that has the least number of hops, for example, and delete the rest of the NOTIFY messages.

If a NOTIFY message corresponding to the QUERY message having a same query ID is received for the first time (OP61: NO), the process proceeds to OP62.

In OP62, the query list 56-4 is searched by a content name included in the received NOTIFY message. The information search unit 52 sets the IP address of the information retention apparatus of the corresponding entry in the query list 56-4 to the IP address of the information retention apparatus included in the received NOTIFY message. The process then proceeds to OP63.

In OP63, the information search unit 52 extracts a query requester address of the corresponding entry in the query list 56-4 extracted in OP62, generates a NOTIFY message whose destination is set to the query requester address, and stores the NOTIFY message in the message send queue of the communication control unit 54. The process illustrated in FIG. 26B then ends.

OP64 to OP66 in FIG. 26C is a process for the case in which the message received by the information search unit 52 is a REDIRECT message.

In OP64, the information search unit 52 searches the query list 56-4 by a content name included in the received REDIRECT message. The information search unit 52 rewrites the IP address of the information retention apparatus of the corresponding entry in the query list 56-4 to the IP address of the information retention apparatus included in the received REDIRECT message. The process then proceeds to OP65.

In OP65, the information search unit 52 searches the ID cache 56-6 by a content name included in the received REDIRECT message. If a corresponding entry exists in the ID cache 56-6, this means that the own apparatus retains the content included in the received REDIRECT message and is working as a proxy for the corresponding entry in the query list 56-4 in OP64 (OP65: YES). In this case, because the information retention apparatus is not changed for the apparatus indicated with the query requester IP address of the corresponding entry in the query list 56-4 in OP64, the process illustrated in FIG. 26C ends without sending a REDIRECT message by the information search unit 52.

In OP65, if an entry corresponding to the content name included in the received REDIRECT message does not exists in the ID cache 56-6, this means that the own apparatus is not the information retention apparatus of the content. In this case, the own apparatus is not working as a proxy server of the content for any apparatus (OP65: NO). The process then proceeds to OP66.

In OP66, the information search unit 52 searches the query list 56-4 by the content name included in the received REDIRECT message. The information search unit 52 extracts a query requester IP address of the corresponding entry in the query list 56-4, generates a REDIRECT message whose destination is set to the query requester IP address, and stores the REDIRECT message in the message send queue of the communication control unit 54. The process illustrated in FIG. 26C then ends.

Figure 27:
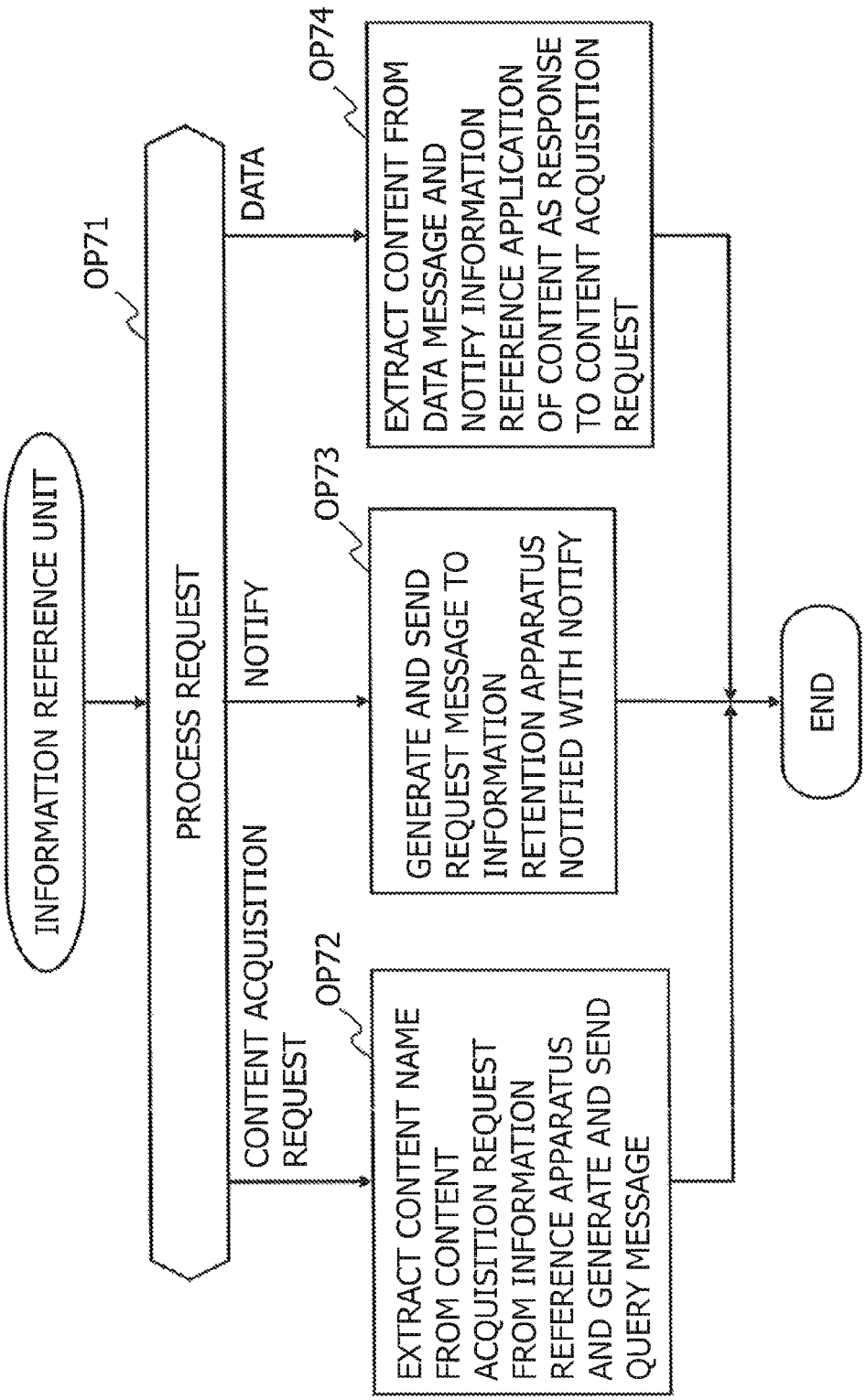
FIG. 27 is one example of a flowchart of the process of an information reference unit of an information processing module.

FIG. 27 is one example of a flowchart of a process of the information reference unit 61 of the information reference module 6. The information reference unit 61 requests the information processing module 5 to search and acquire content in accordance with a content acquisition request from the information reference application 35, and returns the content to the information reference application 35 as a reply. The flowchart illustrated in FIG. 27 starts when the information reference unit 61 receives a content acquisition request from the information reference application 35 or a NOTIFY message or a DATA message from the communication control unit 54 as a process request.

In OP71, the information reference unit 61 determines a type of the preprocess request. If the process request is a content acquisition request from the information reference application 35, the process proceeds to OP72. In OP72, the information reference unit 61 extracts a content name from the content acquisition request from the information reference application 35, generates a QUERY message, and stores the QUERY message in the message send queue of the communication control unit 54. The process illustrated in FIG. 27 then ends.

If the process request is a NOTIFY message, the process proceeds to OP73. In OP73, the information reference unit 61 generates a REQUEST message whose destination is set to the IP address of the information retention apparatus notified with the NOTIFY message and stores the REQUEST message in the message send queue of the communication control unit 54. The process illustrated in FIG. 27 then ends.

If the process request is a DATA message, the process proceeds to OP74. In OP74, the information reference unit 61 extracts content from the DATA message and notifies the information reference application 35 of the content as a response to the content acquisition request. The process illustrated in FIG. 27 then ends.

<Operation Example>

Figure 28:
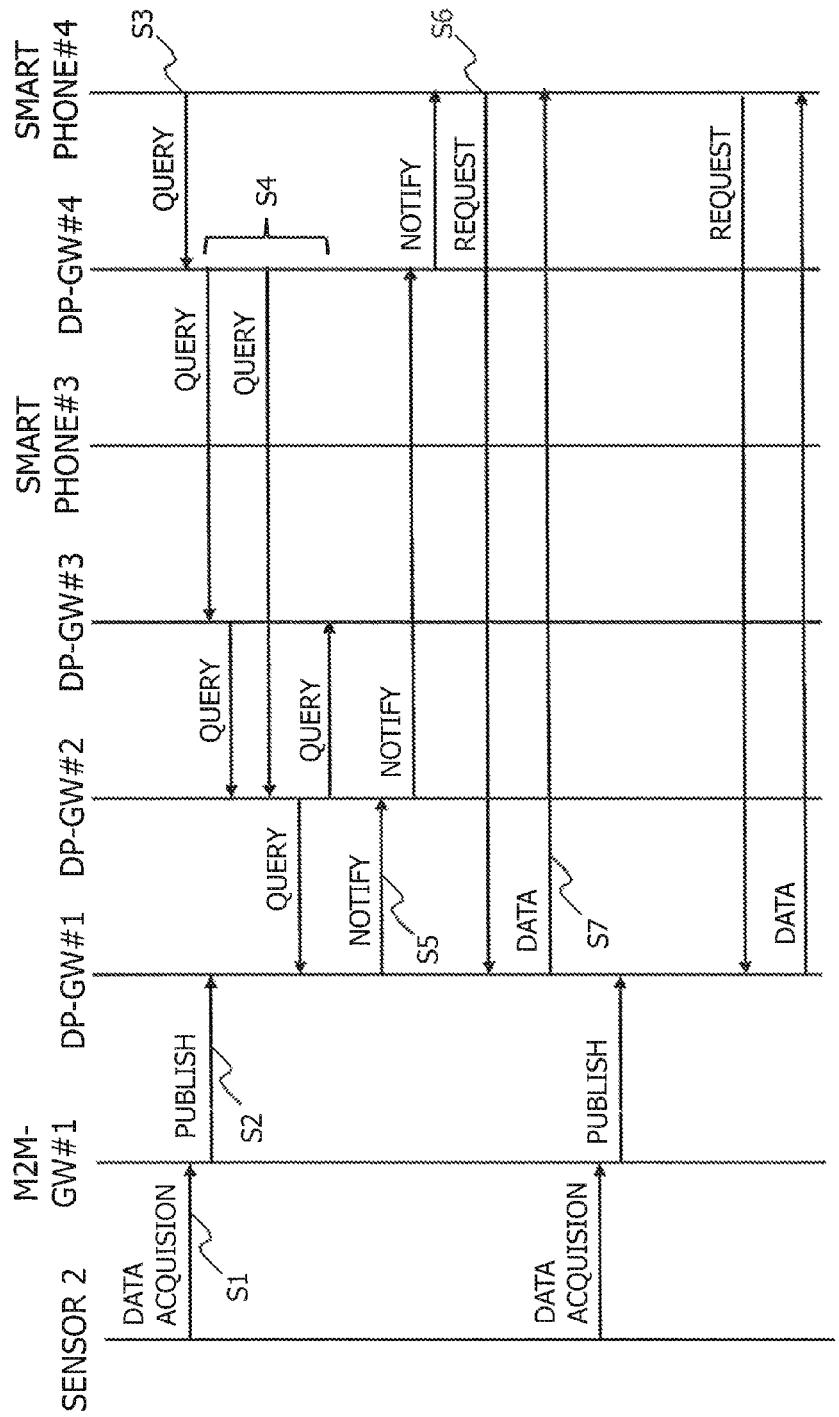
FIG. 28 is one example of a processing sequence of an information processing system.
Figure 29:
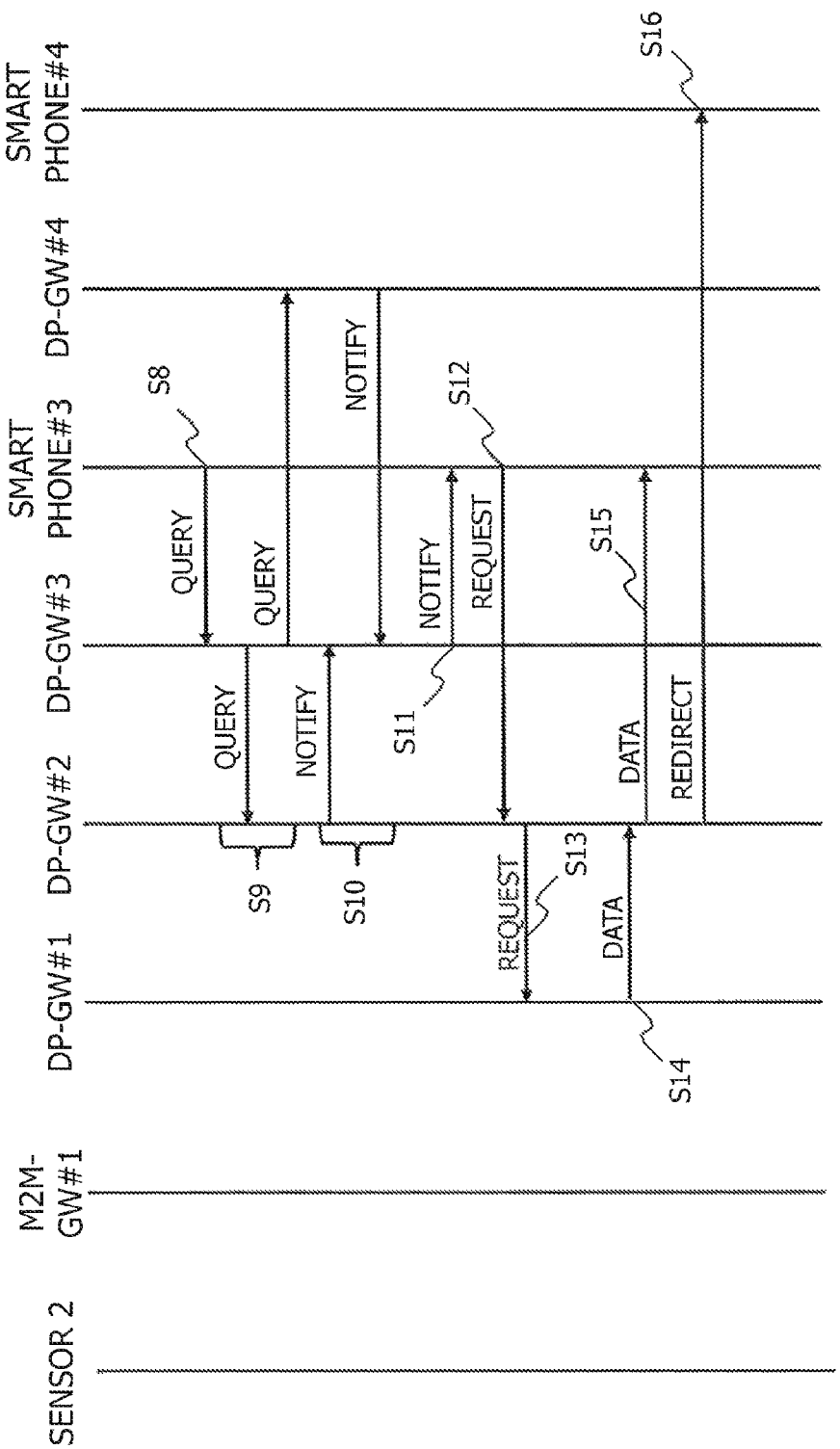
FIG. 29 is one example of a processing sequence of an information processing system.

FIGS. 28, 29, and 30 are one example of a processing sequence of the information processing system 100. In FIGS. 28, 29, 30, the example of publishing temperature sensor information acquired by the sensor 2 is illustrated. And it is assumed that the proxy mode is enabled in the DP-GW#1, the DP-GW#2, the DP-GW#3, and the DP-GW#4.

In S1, the sensor 2 connected to the sensor network SNW#1 periodically acquires a value of a temperature sensor and sends, for example, a sensor identification information sensor001 and a temperature value 28 to the M2M-GW#1.

In S2, the M2M-GW#1 notifies, via a PUBLISH message, the DP-GW#1 of the value of the temperature sensor received from the sensor 2. The M2M-GW#1 gives a content name to the value of the temperature sensor received from the sensor 2 on the basis of a naming rule in the naming rule list 72.

For example, if the M2M-GW#1 retains the naming rule list 72 illustrated in FIG. 22, a content name "temp_LocA_sensor001" is given to the value of the temperature sensor received from the sensor 2.

The PUBLISH message generated in S2 includes a source IP address=the IP address of M2M-GW#1, a destination IP address=the IP address of the DP-GW#1, a content name="temp_LocA_sensor001", and a value of content=28.

Upon receiving the PUBLISH message from the M2M-GW#1, the DP-GW#1 registers the information in the ID cache 56-6. The information set in the ID cache 56-6 of the DP-GW#1 is a content name="temp_LocA_sensor001", a value of content=28, and control information="lifetime=300s", for example. The "lifetime=300s" means that the effective period of this entry in the ID cache 56-6 is 300 seconds and that the entry is deleted when 300 seconds have elapsed without any reference to the corresponding content.

In S3, if a user of a smart phone #4 connected to the communication interface 105 of the DP-GW#4 would like to know a temperature in a town where the user's house is located from outside of the town, the information is referenced from the information reference application 35. For convenience, the identifier of the user's hometown is assumed as "LocA". The smart phone #4 generates a QUERY message (FIG. 27, OP72). The QUERY message includes a source IP address=the IP address of the smart phone #4, a destination IP address=the IP address of the DP-GW#4, a content name="temp_LocA_*", and a query ID="sf100_query01". The IP address of the smart phone #4 is set in the path history information of the QUERY message. The content name included in the QUERY message can be represented by using a wildcard. The content name "temp_LocA_*" means that the "*" may be any value.

In S4, the QUERY message generated in the smart phone #4 arrives at the DP-GW#4 and is relayed by DP-GW#4 to the DP-GW#2 and the DP-GW#3, which are adjacent to DP-GW#4. The QUERY message is repeatedly relayed by each apparatus until reaching the information retention apparatus (DP-GW#1). The process executed in each apparatus is OP51 to OP54 and OP59 in FIG. 26A. In the example illustrated in FIG. 28, the QUERY message is assumed to arrive at DP-GW#1.

The destination of the QUERY message follows the link information 56-5 (FIG. 26A, OP59). In order to avoid looping of the QUERY message, however, sending of the QUERY message to the source is prohibited and a duplicate QUERY message received due to sending through an alternative path is aborted.

In S5, when the QUERY message arrives at the DP-GW#1, the DP-GW#1 generates a NOTIFY message (FIG. 26B, OP61 to OP63). The generated NOTIFY message arrives at the smart phone #4 in accordance with the query list 56-4 of each apparatus.

The NOTIFY message generated in the DP-GW#1 includes a source IP address=the IP address of the DP-GW#1, a destination IP address=the IP address of the DP-GW#2, a content name="temp_LocA_sensor001", a query ID="sf100_query01", and an IP address of the information retention apparatus=the IP address of the DP-GW#1.

The NOTIFY message arrives at the smart phone #4 via the same path as the QUERY message in a reverse direction (DP-GW#1->DP-GW#2->DP-GW#4->smart phone #4). Due to this, the query list 56-4 of each apparatus on the path of the NOTIFY message records that the information retention apparatus of the content named "temp_LocA_sensor001" is the DP-GW#1.

In S6, when the NOTIFY message arrives at the smart phone #4, the smart phone #4 sends a REQUEST message to the information retention apparatus DP-GW#1 notified with the NOTIFY message (FIG. 27, OP73). The generated REQUEST message includes a source IP address=the IP address of the smart phone #4, a destination IP address=the address of the DP-GW#1, a content name="temp_LocA_sensor001", a query ID="sf100_query01", and proxy function information="synchronize=300s". The proxy function information "synchronize=300s" is one example of a setting for the case in which information is updated in every 300 seconds. In the example illustrated in FIG. 28, it is assumed that a query ID is used as a request ID, and the REQUEST message does not include a request ID. The detailed information about a proxy may be given by the information reference application 35.

In S7, the DP-GW#1, which received the REQUEST message from the smart phone #4, searches the ID cache 56-6 by the content name="temp_LocA_sensor001" included in the REQUEST message. The DP-GW#1 extracts the value of content=28 from the corresponding entry in the ID cache 56-6, generates a DATA message, and sends the DATA message to the smart phone #4 (FIG. 24, OP21 to OP24). The generated DATA message includes a source IP address=the address of the DP-GW#1, a destination IP address=the IP address of the smart phone #4, a content name="temp_LocA_sensor001", a query ID="sf100_query01", a value of content=28, and control information="lifetime=300s". Because the received REQUEST message does not include a request ID, the generated DATA message does not include a request ID either.

After that, every time the sensor 2 acquires the value of a temperature sensor in a predetermined cycle, the processes of S1 and S2 are executed. Also, the smart phone #4 periodically sends a REQUEST message to the DP-GW#1 and acquires a value of the content "temp_LocA_sensor001".

Next, in S8 of FIG. 29, if a user of a smart phone #3 wirelessly connected to the communication interface 105 of the DP-GW#3 also would like to know the temperature in the same town as the user of the smart phone #4 from outside of the town, the information is referenced from the information reference application 35 in a similar way. A QUERY message generated in the smart phone #3 includes a source IP address=the IP address of the smart phone #3, a destination IP address=the IP address of the DP-GW#3, a content name="temp_LocA_*", and a query ID="sf200_query01" (FIG. 27, OP72).

In S9, as with the QUERY message generated in the smart phone #4, the QUERY message generated in the smart phone #3 is repeatedly relayed by each apparatus until reaching the information retention apparatus DP-GW#1. The QUERY message generated in the smart phone #3 arrives at the DP-GW#3 and is then sent from the DP-GW#3 to the adjacent DP-GW#2 and the DP-GW#4.

Unlike the case of the smart phone #4 (S3), the DP-GW#2 and the DP-GW#4 have already responded to the QUERY message from the smart phone #4 regarding the content name="temp_LocA_*" and have acquired the IP address of the information retention apparatus DP-GW#1 of the content name="temp_LocA_sensor001". Thus, in S10, the DP-GW#2 and the DP-GW#4 become candidates of apparatuses in which a proxy function is deployed and send the DP-GW#3 a NOTIFY message in which an IP address of an information retention apparatus is set to the IP address of the own apparatus (FIG. 26A, OP51 to OP53, OP55 to OP57, and OP60).

The NOTIFY message generated in the DP-GW#2 includes a source IP address=the IP address of the DP-GW#2, a destination IP address=the IP address of the DP-GW#3, a content name="temp_LocA_sensor001", a query ID="sf200_query01", and an IP address of an information retention apparatus=the IP address of the DP-GW#2. The NOTIFY message generated in the DP-GW#4 includes a source IP address=the IP address of the DP-GW#4, a destination IP address=the IP address of the DP-GW#3, a content name="temp_LocA_sensor001", a query ID="sf200_query01", and an IP address of an information retention apparatus=the IP address of the DP-GW#4.

The DP-GW#3 selects one of the NOTIFY messages received from the DP-GW#2 and the DP-GW#4. In the first embodiment, because an initially received NOTIFY message is effective, a subsequently received NOTIFY message is aborted (FIG. 26B). It is assumed here that the NOTIFY message from the DP-GW#2 is initially received and the NOTIFY message from the DP-GW#4 is aborted.

In S11, the DP-GW#3 sends a NOTIFY message to the smart phone #3 (FIG. 26B, OP63). The NOTIFY message generated in the DP-GW#3 includes a source IP address=the IP address of the DP-GW#3, a destination IP address=the IP address of the smart phone #3, a content name="temp_LocA_sensor001", a query ID="sf200_query01", and an IP address of an information retention apparatus=the IP address of the DP-GW#2.

In S12, when the NOTIFY message arrives at the smart phone #3, a smart phone #3 sends a REQUEST message to the information retention apparatus DP-GW#2 notified with the NOTIFY message (FIG. 27, OP73). The generated REQUEST message includes a source IP address=the IP address of the smart phone #3, a destination IP address=the IP address of the DP-GW#2, a content name="temp_LocA_sensor001", a query ID="sf200_query01", and proxy function information="synchronize=600s".

In S13, upon receiving the REQUEST message from the smart phone #3, the DP-GW#2 starts a process of a proxy server (FIG. 24, OP21, OP22, OP25 to OP29). The information retention apparatus of the content name="temp_LocA_sensor001" is the DP-GW#1, and the DP-GW#2 does not retain the content corresponding to the content name="temp_LocA_sensor001" at this moment. Thus, the DP-GW#2 invokes a program that acquires the content corresponding to the content name="temp_LocA_sensor001" from the DP-GW#1 in every 600 seconds in accordance with the proxy function information="synchronize=600s" in the REQUEST message (FIG. 24, OP27, OP28).

Also, in order to process the REQUEST message from the smart phone #3, the DP-GW#2 sends a REQUEST message to the DP-GW#1 (FIG. 24, OP26). The DP-GW#2 sets the request ID="sf200_query01", the requestor IP address=the IP address of the smart phone #3, and the proxy function information="synchronize=600s" in the process pending list 56-1 for the succeeding processing (FIG. 24, OP29). Because the REQUEST message from the smart phone #3 does not include a request ID, the DP-GW#2 sets the request ID in the process pending list 56-1 to the query ID of the REQUEST message.

The REQUEST message generated by the DP-GW#2 includes a source IP address=the IP address of the DP-GW#2, a destination IP address=the IP address of the DP-GW#1, a content name="temp_LocA_sensor001", a query ID="sf200_query01", and proxy function information="synchronize=600s".

In S14, upon receiving the REQUEST message from the DP-GW#2, the DP-GW#1 searches the ID cache 56-6 by the content name="temp_LocA_sensor001" included in the REQUEST message, extracts the value of content=28, generates a DATA message, and sends the DATA message to the DP-GW#2 (FIG. 24, OP21 to OP24).

The generated DATA message includes a source IP address=the IP address of the DP-GW#1, a destination IP address=the IP address of the DP-GW#2, a content name="temp_LocA_sensor001", a query ID="sf200_query01", a value of content=28, and control information="lifetime=300s". Because the REQUEST message from the DP-GW#2 does not include a request ID, the generated DATA message does not include a request ID either.

Upon receiving the DATA message from the DP-GW#1, the DP-GW#2 sets the content name="temp_LocA_sensor001", the value of content=28, and the control information="lifetime=300s" in the ID cache 56-6 (FIG. 24, OP34). Also, the DP-GW#2 searches the process pending list 56-1 by the request ID="sf200_query01", extracts the IP address of the smart phone #3, which corresponds to the requester IP address, and relays the DATA message (FIG. 24, OP31). Because the DATA message from the DP-GW#1 does not include a request ID, the DP-GW#2 uses the query ID of the DATA message as a request ID for searching the process pending list 56-1.

The DATA message relayed by the DP-GW#2 includes a source IP address=the IP address of the DP-GW#2, a destination IP address=the IP address of the smart phone #3, a content name="temp_LocA_sensor001", a query ID="sf200_query01", a value of content=28, and control information="lifetime=300s".

In S15, the DP-GW#2 searches the query list 56-4 by the content name="temp_LocA_sensor001" and extracts the entry of the smart phone #4. The DP-GW#2 extracts the query requester IP address=the IP address of the smart phone #4 from the extracted entry and sends a REDIRECT message to the smart phone #4 (FIG. 24, OP32). The generated REDIRECT message includes a source IP address=the IP address of the DP-GW#2, a destination IP address=the IP address of the smart phone #4, a content name="temp_LocA_sensor001", a query ID="sf100_query01", and an IP address of an information retention apparatus=the IP address of the DP-GW#2.

In S16, upon receiving the REDIRECT message from the DP-GW#2, the smart phone #4 rewrites, in the query list 56-4, the IP address of the information retention apparatus of the content name="temp_LocA_sensor001" and the query ID="sf100_query01" from the IP address of the DP-GW#1 to the IP address of the DP-GW#2 (FIG. 26C, OP64).

In S17 of FIG. 30, due to the process of a proxy server, the DP-GW#2 autonomously generates a REQUEST message to the DP-GW#1, receives a DATA message from the DP-GW#1, and updates the ID cache 56. In S17, a proxy program in the DP-GW#2 acquires the content of the content name="temp_LocA_sensor001" from the DP-GW#1 in every 600 seconds.

In S18, the smart phone #3 sends a REQUEST message to the DP-GW#2 in accordance with the query list 56-4 and acquires the content of the content name="temp_LocA_sensor001" from the ID cache 56-6 of the DP-GW#2.

In S19, the smart phone #4 also sends a REQUEST message to the DP-GW#2 in accordance with the query list 56-4 and acquires the content of the content name="temp_LocA_sensor001" from the ID cache 56-6 of the DP-GW#2. However, because the REQUEST message from the smart phone #4 includes the proxy function information="synchronize=300s", which indicates a higher frequency of information update than the proxy function information="synchronize=600s" in the REQUEST message from the smart phone #3, the DP-GW#2 adjusts the control parameter of the running proxy so that the content of the content name="temp_LocA_sensor001" is acquired from the DP-GW#1 in every 300 seconds.

<Operations and Effects of First Embodiment>

In the first embodiment, each apparatus in the information processing system 100 dynamically generates the query list 56-4 by receiving, sending, or relaying a QUERY message. The query list 56-4 includes an IP address of an information retention apparatus of searched content. Thus, if an entry of the content name searched with the QUERY message is retained in the query list 56-4, the GW apparatus 1 can return the IP address of the information retention apparatus of the content for a QUERY message that is received from another apparatus and that includes the content name in accordance with the entry in the query list 56-4.

Also, when the GW apparatus 1 receives a QUERY message from an apparatus that is not recorded in the query list 56-4 as a query requester apparatus for content that has an entry in the query list 56-4, sends a NOTIFY message to the apparatus, and receives a REQUEST message from the apparatus, then the GW apparatus 1 starts working as a proxy serves of the content. If the GW apparatus 1 receives a QUERY message from an apparatus that is not recorded in the query list 56-4 for content that has an entry in the query list 56-4, this means that the GW apparatus 1 is a branch point of information distribution. Thus, in the first embodiment, it is possible to dynamically deploy a proxy server at a branch point of information distribution within the system.

Also, if an IP address of an information retention apparatus of an entry in the query list 56-4 has changed, the GW apparatus 1 sends a REDIRECT message to a query requester apparatus of an entry having a same content name for giving notice of the IP address of a new information retention apparatus. This facilitates updating of the query list 56-4 of an information reference apparatus for which the GW apparatus 1 is working as a proxy server and maintaining consistency of the query list 56-4. If the new information retention apparatus is the GW apparatus 1 itself, then the GW apparatus 1 becomes a proxy server for an information reference apparatus to which a REDIRECT message is sent, which facilitates consolidation of communication within a network and effective use of the network.

Also, in the first embodiment, an information reference apparatus can reflect the setting thereof on the GW apparatus 1 working as a proxy server by appending setting information about a proxy algorithm (proxy function information) in a REQUEST message. For example, an information reference apparatus can update content in a desired frequency by specifying an interval of acquiring content using the proxy function information in the REQUEST message.

Also, the GW apparatus 1 that is about to start working as a proxy comprehensively adjusts setting information about a proxy function algorithm (proxy function information) included in REQUEST messages from a plurality of information reference apparatuses. Thus, if one information reference apparatus demands to acquire content at intervals of 60 seconds and another information reference apparatus demands to acquire content at intervals of 30 seconds, for example, the GW apparatus 1 working as a proxy can satisfy these demands of both apparatuses by setting the interval of acquiring content from an information generation apparatus to 30 seconds.

As described above, in accordance with the first embodiment, it is possible to autonomously deploy a proxy for relaying communication data in an area where requests for content concentrate by providing each apparatus in a network with a content search function that uses the query list 56-4 and a function that dynamically deploys a proxy function and modifies the query list in response to a content acquisition request, without statically deploying a special apparatus such as a cache server. This facilitates reduction of traffic in the whole network and the amount of memory used as a cache server.

Also, in the first embodiment, the GW apparatus 1 invokes an execution object (proxy program) identified by the proxy control information in a REQUEST message when working as a proxy. This enables an execution object corresponding to a content requested in a REQUEST message to be invoked. Thus, because the latest value of the content is periodically acquired by the execution object even when the value of the content frequently changes, the GW apparatus 1 working as a proxy server can retain the latest value of the content and provide an information reference apparatus with the latest value of the content.

According to the disclosed node apparatus, information system, information processing method, and information processing program, a proxy server can be deployed at an appropriate position to increase the utilization ratio of a network.

<Others>

Even though the first embodiment illustrates an example of a proxy that distributedly allocates and synchronizes data when a value of content dynamically changes, as with the case of a value of a sensor, for example, the operation of the proxy is not limited to the synchronous control of data. In an apparatus that works as a proxy, because communication is once terminated at an application layer, proxy operations that need information analysis at the application layer, such as static caching of content in a cache server, cooperative load balancing in a plurality of apparatuses retaining content, and application-level data filtering, can be easily created.

Also, even though in the first embodiment the GW apparatus 1 starts working as a proxy server when receiving a REQUEST message for a content from a second information reference apparatus (see FIG. 7), the condition for the GW apparatus 1 to start working as a proxy server is not limited to this. For example, as illustrated with the process (4) in FIG. 4, the GW apparatus 1 may start working as a proxy server when sending a NOTIFY message corresponding to a QUERY message for a content from a first information reference apparatus.

In other words, it is possible to allow the GW apparatus 1 to start working as a proxy server when a predetermined start condition is met. In the case of the example described in the first embodiment, the start condition is that a REQUEST message for content is received from a second information reference apparatus; in other words, the start condition is that the query list 56-4 includes two or more entries of the content that already include an IP address of an information retention apparatus and that a REQUEST message is received from a second information reference apparatus.

In case the GW apparatus 1 starts working as a proxy server when sending a NOTIFY message corresponding to a QUERY message for particular content from a first information reference apparatus, the start condition is that the query list 56-4 includes one or more entries of the content that already include an IP address of an information retention apparatus.

In other words, the start condition can be controlled on the basis of the number of entries of the content in the query list 56-4 that already include an IP address of an information retention apparatus.

The start condition may be set differently for each content type. Also, the start condition may be the same as the proxy execution condition. The start condition is one example of a "predetermined condition".

All examples and conditional language provided herein are intended for the pedagogical purposes of aiding the reader in understanding the invention and the concepts contributed by the inventor to further the art, and are to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node apparatus to be connected to an information retention apparatus and a plurality of information reference request apparatuses including a first information reference request apparatus and a second information apparatus via a network, the node apparatus comprising:

a first memory configured to retain first content identification information of first content, identification information of the first information reference request apparatus, and identification information of the information retention apparatus that are acquired through an information search, the information search initiated by a first search request from the first information reference request apparatus, and wherein a response to the first search request is responded from the information retention apparatus during the information search;

a second memory configured to retain content; and a processor configured to:

acquire the first content from the information retention apparatus without storing the acquired first content in the second memory when receiving a first content acquisition request for acquiring the first content from the first information reference request apparatus;

respond to the first content acquisition request by sending the first content to the first information reference request apparatus;

determine, when receiving a second content acquisition request for acquiring the first content from the second information reference request apparatus, whether the first content identification information is retained in the first memory and whether the first content is retained in the second memory;

acquire the first content from the information retention apparatus and store the acquired first content in the second memory when the first content identification information is retained in the first memory and the first content is not retained in the second memory; and respond to the second content acquisition request from the second information reference request apparatus on behalf of the information retention apparatus.

2. The node apparatus according to claim 1,
wherein the processor is configured to invoke an update processing for updating the first content retained in the second memory when the first content is retained in the second memory.

3. The node apparatus according to claim 1,
wherein the processor is configured to send to the second information reference request apparatus a notification in which the node apparatus is identified as the information retention apparatus retaining the first content when a second search request including the first content identification information is received from the second information reference request apparatus.

4. The node apparatus according to claim 2, wherein,
when storing the first content in the second memory, the processor is configured to send to the first information reference request apparatus an update notification in which the node apparatus is identified as the information retention apparatus retaining the first content.

5. The node apparatus according to claim 2, wherein,
when the second content acquisition request includes control information, the processor is configured to invoke the update processing in accordance with the control information.

6. An information processing system comprising:
an information retention apparatus,
a plurality of information reference request apparatuses including a first information reference request apparatus and a second information reference request apparatus, and
a node apparatus connected to the information retention apparatus and the information reference request apparatus via a network,
wherein the node apparatus comprises:
a first memory configured to retain first content identification information of first content, identification information of the first information reference request apparatus, and identification information of the information retention apparatus that are acquired through an information search, the information search initiated by a first search request from the first information reference request apparatus, and wherein a response to the first search request is responded from the information retention apparatus during the information search;
a second memory configured to retain content; and
a processor configured to:
acquire the first content from the information retention apparatus without storing the acquired first content in the second memory when receiving a first content acquisition request for acquiring the first content from the first information reference request apparatus;
respond to the first content acquisition request by sending the first content to the first information reference request apparatus;
determine, when receiving a second content acquisition request for acquiring the first content from the second information reference request apparatus, whether the first content identification information is retained in the first memory and whether the first content is retained in the second memory;
acquire the first content from the information retention apparatus and store the acquired first content in the second memory when the first content identification information is retained in the first memory and the first content is not retained in the second memory; and
respond to the second content acquisition request from the second information reference request apparatus on behalf of the information retention apparatus.

7. An information processing method for a node apparatus connected to an information retention apparatus and a plurality of information reference request apparatuses including a first information reference request apparatus and a second information reference request apparatus via a network, the information processing method comprising:
retaining, in a first memory, first content identification information of first content, identification information of the first information reference request apparatus, and identification information of the information retention apparatus that are acquired through an information search, the information search initiated by a first search request from the first information reference request apparatus, and wherein a response to the first search request is responded from the information retention apparatus during the information search;
retaining content in a second memory;
acquiring the first content from the information retention apparatus without storing the acquired first content in the second memory when receiving a first content acquisition request for acquiring the first content from the first information reference request apparatus;
responding to the first content acquisition request by sending the first content to the first information reference request apparatus;
determining, when receiving a second content acquisition request for acquiring the first content from the second information reference request apparatus, whether the first content identification information is retained in the first memory and whether the first content is retained in the second memory;
acquiring the first content from the information retention apparatus and storing the acquired first content in the second memory when the first content identification information is retained in the first memory and the first content is not retained in the second memory; and
responding to the second content acquisition request from the second information reference request apparatus on behalf of the information retention apparatus.

8. A non-transitory computer-readable recording medium recording information processing program for causing a node apparatus, which is connected to an information retention apparatus and a plurality of information reference request apparatuses including a first information reference request apparatus and a second information reference request apparatus via a network, to perform a process comprising:
retaining, in a first memory, first content identification information of first content, identification information of the first information reference request apparatus, and identification information of the information retention apparatus that are acquired in an information search, the information search initiated by a first search request from the first information reference request apparatus and wherein a response to the first search request is responded from the information retention apparatus during the information search;
retaining content in a second memory;
acquiring the first content from the information retention apparatus without storing the acquired first content in the second memory when receiving a first content acquisition request for acquiring the first content from the first information reference request apparatus;

responding to the first content acquisition request by sending the first content to the first information reference request apparatus;

determining, when receiving a second content acquisition request for acquiring the first content from the second information reference request apparatus, whether the first content identification information is retained in the first memory and whether the first content is retained in the second memory;

acquiring the first content from the information retention apparatus and storing the acquired first content in the second memory when the first content identification information is retained in the first memory and the first content is not retained in the second memory; and responding to the second content acquisition request from the second information reference request apparatus on behalf of the information retention apparatus.

* * * * *